US010326912B2

(12) United States Patent
Yanai

(10) Patent No.: US 10,326,912 B2
(45) Date of Patent: Jun. 18, 2019

(54) IMAGE FORMATION WITH THICKNESS VARIATION OF HIGH TRANSMITTANCE COLOR MATERIAL APPLIED ON MEDIUM GENERATING INTERFERENCE FRINGES

(71) Applicant: CANON KABUSHIKI KAISHA, Tokyo (JP)

(72) Inventor: Tomokazu Yanai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 567 days.

(21) Appl. No.: 14/929,620

(22) Filed: Nov. 2, 2015

(65) Prior Publication Data

US 2016/0121620 A1 May 5, 2016

(30) Foreign Application Priority Data

Nov. 5, 2014 (JP) ................................ 2014-225199
Oct. 14, 2015 (JP) ................................ 2015-203158

(51) Int. Cl.
| | |
|---|---|
| *H04N 1/58* | (2006.01) |
| *B41J 2/21* | (2006.01) |
| *H04N 1/50* | (2006.01) |
| *H04N 1/52* | (2006.01) |
| *H04N 1/60* | (2006.01) |
| *B41J 19/14* | (2006.01) |
| *B41J 2/205* | (2006.01) |
| *H04N 1/034* | (2006.01) |

(52) U.S. Cl.
CPC .............. *H04N 1/502* (2013.01); *B41J 2/205* (2013.01); *B41J 2/2114* (2013.01); *B41J 2/2121* (2013.01); *B41J 2/2132* (2013.01); *B41J 19/147* (2013.01); *H04N 1/52* (2013.01); *H04N 1/58* (2013.01); *H04N 1/6027* (2013.01); *B32B 2307/4023* (2013.01); *H04N 1/034* (2013.01)

(58) Field of Classification Search
None
See application file for complete search history.

(56) References Cited

U.S. PATENT DOCUMENTS 9,168,757 B2 * 10/2015 Yanai ..................... H04N 1/54
9,296,225 B2 * 3/2016 Yanai ..................... G01N 21/00
(Continued)

FOREIGN PATENT DOCUMENTS

JP 2012-090105 A 5/2012

OTHER PUBLICATIONS

Lau et al., "Modern Digital Halftoning (Signal Processing and Communications)", 2001, pp. 202-203, 274-275.
(Continued)

*Primary Examiner* — Scott A Rogers
(74) *Attorney, Agent, or Firm* — Carter, DeLuca & Farrell LLP

(57) ABSTRACT

An object is to reduce coloring of specular reflection while improving gloss uniformity (particularly, gloss clarity). Recording is performed at least part of a surface of a recording medium by using a first color material with relatively high transmittance. In this case, control is performed such that thickness variation in the applied first color material is set to have an amplitude that generates interference fringes and to have a desired cycle within a range of 40 µm or more and 320 µm or less.

17 Claims, 27 Drawing Sheets

(56) References Cited

U.S. PATENT DOCUMENTS

| | | | |
|---|---|---|---|
| 2007/0091138 A1* | 4/2007 | Hersch | B41F 33/0036 347/19 |
| 2011/0032553 A1* | 2/2011 | Funahashi | H04N 1/6016 358/1.9 |
| 2016/0279922 A1* | 9/2016 | Arai | H04N 1/50 |

OTHER PUBLICATIONS

Lau et al., Modern Digital Halftoning (Signal Processing and Communications), Chapter 6. Green-Noise Dithering, 2001, pp. 200-203, 274-277.

* cited by examiner

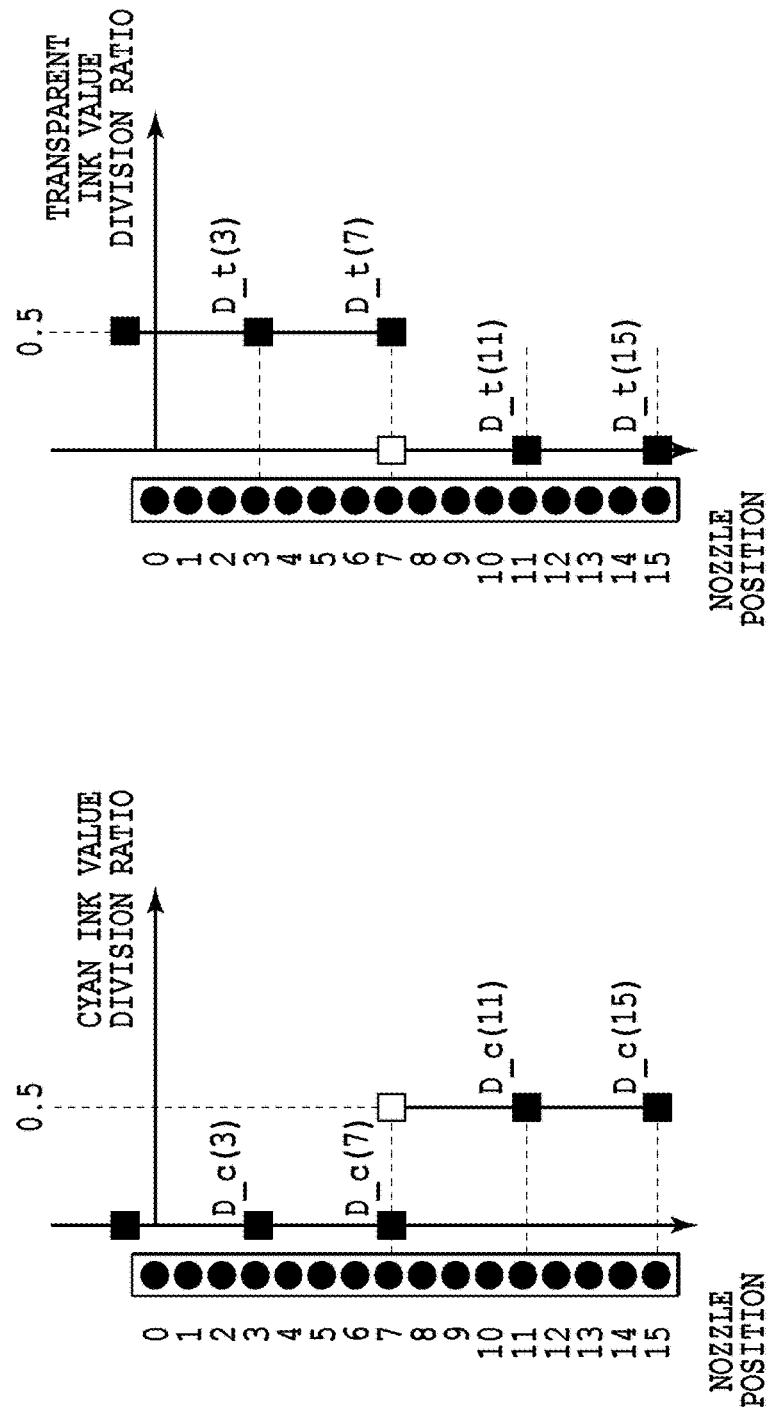

| Th_c | | | |
|---|---|---|---|
| 1 | 136 | 34 | 170 |
| 204 | 68 | 238 | 102 |
| 51 | 187 | 17 | 153 |
| 255 | 119 | 221 | 85 |

952

| Th_t | | | |
|---|---|---|---|
| 1 | 1 | 170 | 170 |
| 1 | 1 | 170 | 170 |
| 255 | 255 | 85 | 85 |
| 255 | 255 | 85 | 85 |

IMAGE FORMATION WITH THICKNESS VARIATION OF HIGH TRANSMITTANCE COLOR MATERIAL APPLIED ON MEDIUM GENERATING INTERFERENCE FRINGES

BACKGROUND OF THE INVENTION

Field of the Invention

The present invention relates to an image formation apparatus and an image formation method which use inks varying in transmittance.

Description of the Related Art

There are various recording methods for recording apparatuses configured to record images on sheet-like recording media such as a paper sheet and a film. An inkjet recording method is known as one of the recording methods. In recent years, various recording agents have been proposed for a recording apparatus employing the inkjet recording method. A pigment ink is a typical example of the recording agents.

As for the pigment ink, a color material exists as particles with a size of about several tens of nanometers in the recording agent. Having a large particle size of the color material, the pigment ink hardly permeates into the recording medium and is fixed on a surface of the recording medium. In the case of pigment inks, a color material printed first is fixed on the surface of the recording medium, and a color material printed after a while is fixed on the first-printed color material. As described above, which one of an upper layer or a lower layer a pigment ink is arranged in tends to be determined depending on the order of fixation.

Occurrence of two specular reflection coloring phenomena is known as characteristics of pigment inks. Specifically, bronzing and a thin-film interference phenomenon are known to occur.

The bronzing is a phenomenon in which, for example, specular reflection assumes magenta in a region where a cyan ink is widely used as the color material arranged in the upper layer. The bronzing occurs due to wavelength dependence of an index of refraction by the pigment ink arranged in the upper layer on the recording medium, and is caused by the pigment ink color material itself.

The thin-film interference phenomenon is an optical thin-film interference phenomenon occurring in a case where a pigment ink with high transmittance (for example, a transparent ink) is fixed in the upper layer with a thickness of 2 µm or less. In the optical thin-film interference phenomenon, chroma and hue in the coloring of the specular reflection vary depending on the thickness. It is known that, in the thin-film interference phenomenon, the coloring can be reduced (turned into white color) by increasing the thickness of the ink (setting the thickness to 2 µm or more) or by making the thickness of the ink uneven (increasing the variation of the thickness).

Japanese Patent Laid-Open No. 2012-90105 proposes a technique of reducing the aforementioned two specular reflection coloring phenomena (bronzing and thin-film interference phenomenon). In Japanese Patent Laid-Open No. 2012-90105, the specular reflection coloring due to the bronzing can be reduced by forming the upper layer of an image with an ink with high transmittance (transparent color material) whose index of refraction has small wavelength dependence. Furthermore, a color material amount of the ink with high transmittance (transparent color material) in a target pixel and a color material amount of the ink with high transmittance (transparent color material) in each of pixels around the target pixel are controlled to be different from each other, and the thickness is thereby made uneven to locally generate lights of various colors. In a case where the local lights of various colors are viewed macroscopically, the various colors are blended and the thin-film interference phenomenon is observed such that the observed light is close to a white light. As a result, the specular reflection coloring due to the thin-film interference phenomenon is reduced.

However, in the method described in aforementioned Japanese Patent Laid-Open No. 2012-90105, the thickness of the ink with high transmittance (transparent color material) arranged in the upper layer of the image is made uneven, and roughness on the image surface is increased. Accordingly, gloss uniformity (particularly, gloss clarity and gloss clarity) decreases.

SUMMARY OF THE INVENTION

An image formation apparatus of the present invention is an image formation apparatus configured to form an image by using at least a first color material and a second color material which vary in transmittance. The image formation apparatus comprises: a recording unit configured to perform recording on at least part of a surface of a recording medium by applying the first color material which has the higher transmittance out of the color materials; and a control unit configured to control the recording unit such that thickness variation in the applied first color material is set to have an amplitude that generates interference fringes and to have a desired cycle within a range of 40 µm or more and 320 µm or less.

Further features of the present invention will become apparent from the following description of exemplary embodiments (with reference to the attached drawings).

BRIEF DESCRIPTION OF THE DRAWINGS

FIGS. 11A and 11B are diagrams illustrating ink value division ratios;

FIG. 17 is a diagram illustrating a C threshold matrix Th_c and a T threshold matrix Th_t;

FIG. 19 is a diagram illustrating results of dot data generation for a cyan ink and an ink with high transmittance (transparent ink) in each scan number;

FIG. 20 is a diagram illustrating relationships between an upper layer and a lower layer in accumulated dot data of the cyan ink and the ink with high transmittance (transparent ink) in Embodiment 1;

FIG. 26 is a diagram illustrating relationships between the upper layer and the lower layer in the accumulated dot data of the cyan ink and the ink with high transmittance (transparent ink) in Embodiment 2; and FIG. 27 is a diagram illustrating relationships between the upper layer and the lower layer in the accumulated dot data of the cyan ink and the ink with high transmittance (transparent ink) in Embodiment 3.

DESCRIPTION OF THE EMBODIMENTS

The present invention is described below in detail based on preferred embodiments thereof with reference to the attached drawings. The configurations given in the following embodiments are merely examples and the present invention is not limited to the illustrated configurations.

[Embodiment 1]

In Embodiment 1, an ink with relatively low transmittance and an ink with relatively high transmittance are used. Here, description is given of an example in which the ink with relatively low transmittance is more likely to cause bronzing and the ink with relatively high transmittance is less likely to cause the bronzing. Moreover, description is given of an example in which the ink with relatively low transmittance is less likely to cause a thin-film interference phenomenon and the ink with relatively high transmittance is more likely to cause the thin-film interference phenomenon.

Moreover, in the embodiment, an ink whose average thickness is 2 µm or less is used as the ink with relatively high transmittance. Furthermore, in the embodiment, at least part of the ink with relatively high transmittance (transparent ink) is fixed in a layer above the ink with relatively low transmittance (color ink). In this case, nonuniformity (variation) of the thickness in the ink with high transmittance is increased with inclination of a normal direction to an image surface kept small. This reduces coloring of specular reflection while improving gloss uniformity (particularly, gloss clarity).

The inclination of the normal direction to the image surface is kept small by setting a cycle of thickness variation in this case to 40 µm or more. Furthermore, also considering a spatial frequency characteristic of vision, lights of various colors in local areas can be made less visible by setting the cycle of the thickness variation to 320 µm or less. This can reduce the coloring of specular reflection while improving the gloss uniformity (particularly, gloss clarity). Details will be described later.

Hereafter, the ink with relatively high transmittance is referred to as transparent ink and the ink with relatively low transmittance is referred to as color ink (cyan, magenta, yellow, and black inks) for sake of convenience. Accordingly, keep in mind that the transparent ink refers to the ink with relatively high transmittance. Specifically, it is only necessary that the transparent ink has higher transmittance than the color ink to be described later. An ink which is slightly cloudy or slightly colored and a yellow ink which has higher transmittance than a black ink can be also referred to as transparent ink.

Figure 1:
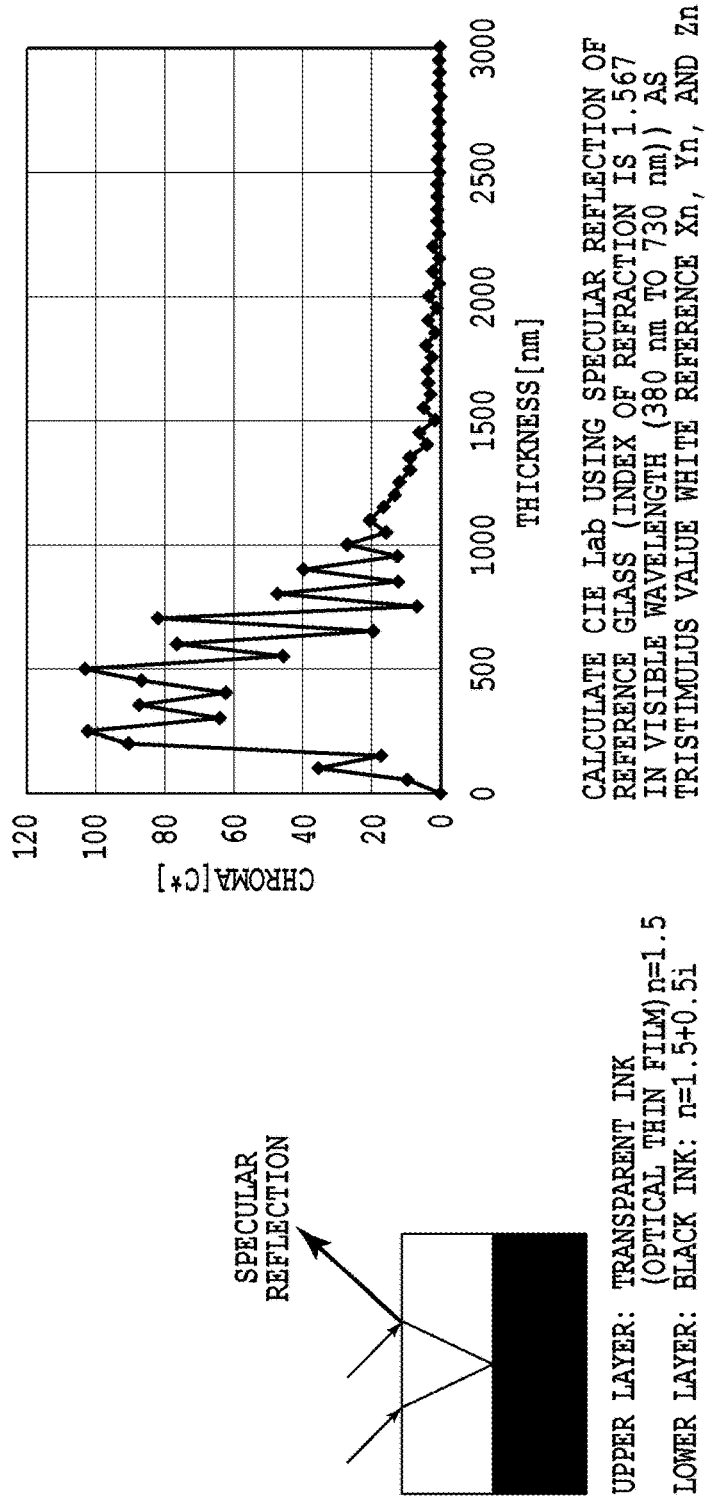
FIGS. 1A and 1B are views illustrating relationships between a thickness of a transparent ink and chroma (C*)

The control of the transparent ink in the embodiment is applied to a region in which the average thickness of the transparent ink is 2 µm or less. The reason for this is that the thin-film interference phenomenon occurs in a region in which the average thickness of the transparent ink is 2 µm or less. FIGS. 1A and 1B illustrate a relationship between the thickness of the transparent ink and chroma (C*) of the coloring of the specular reflection in the thin-film interference phenomenon.

The horizontal axis of FIG. 1B represents the average thickness of the transparent ink, and the vertical axis of FIG. 1B represents the chroma (*C) of the coloring of the specular reflection which occurs due to the thin-film interference phenomenon. The chroma $C^*$ is chroma in $L^*a^*b^*$ of International Commission on Illumination (CIE) and is defined by $C^*=\operatorname{sqrt}(a^{*^2}+b^{*^2})$. The smaller the chroma $C^*$ is, the lower the degree of coloring is. It is found from FIG. 1B that the chroma $C^*$ satisfies $C^*\leq 3$ in a case where the average thickness of the transparent ink is 2 µm or more. $C^*$ can be substituted as a color difference $\Delta E$ from an achromatic color. An A-class allowable difference (color difference which can be hardly perceived by human) defined by Japan Color Research Institute is $\Delta E\leq 3$, and it can be thus said that the specular reflection coloring due to the thin-film interference phenomenon cannot be visually perceived under a condition where the average thickness is 2 µm or more. Specifically, as long as the average thickness is 2 µm or more, the specular reflection coloring cannot be visually perceived even if the nonuniformity (variation) of the thickness in the transparent ink is small. Accordingly, there is no need to perform the control of increasing the nonuniformity (variation) of the thickness and the control described in the embodiment is unnecessary. To put it the other way around, in the case where the average thickness is 2 µm or less, since the specular reflection coloring due to the thin-film interference phenomenon can be visually perceived, the control of increasing the nonuniformity (variation) of the thickness to be described in the embodiment is necessary. The embodiment has an effect of reducing the specular reflection coloring by increasing the nonuniformity (variation) of the thickness under the condition where the average thickness of the transparent ink is 2 µm or less.

Moreover, description is given of an example in which the transparent ink used in the embodiment is a water based ink including a relatively small amount of resin (polymer). In the water based ink, the resin (polymer) needs to be added in a form of particles in the nanometer order in order to disperse and stabilize the polymer in ink solution. In the water based ink, since moisture is vaporized in ink fixation, substances to be eventually fixed are additives consisted mainly of the polymer. Accordingly, the thickness of the ink after the fixation is approximately 2 µm or less in average. However, the average thickness may exceed 2 µm in a region where the amount of the transparent ink is great. In this case, the control of the transparent ink in the embodiment is unnecessary. Moreover, the embodiment can be applied to a case where the average thickness is 2 µm or less in types of inks other than the water based ink. Generally, in a case where the transparent ink is a solvent-based ink, a UV-curing ink, or the like, the thickness is likely to be 2 µm or more. However, in a case of using a solvent-based ink or a UV-curing ink having such properties that thickness becomes 2 µm or less, the control to be described below can be applied.

Figure 2:
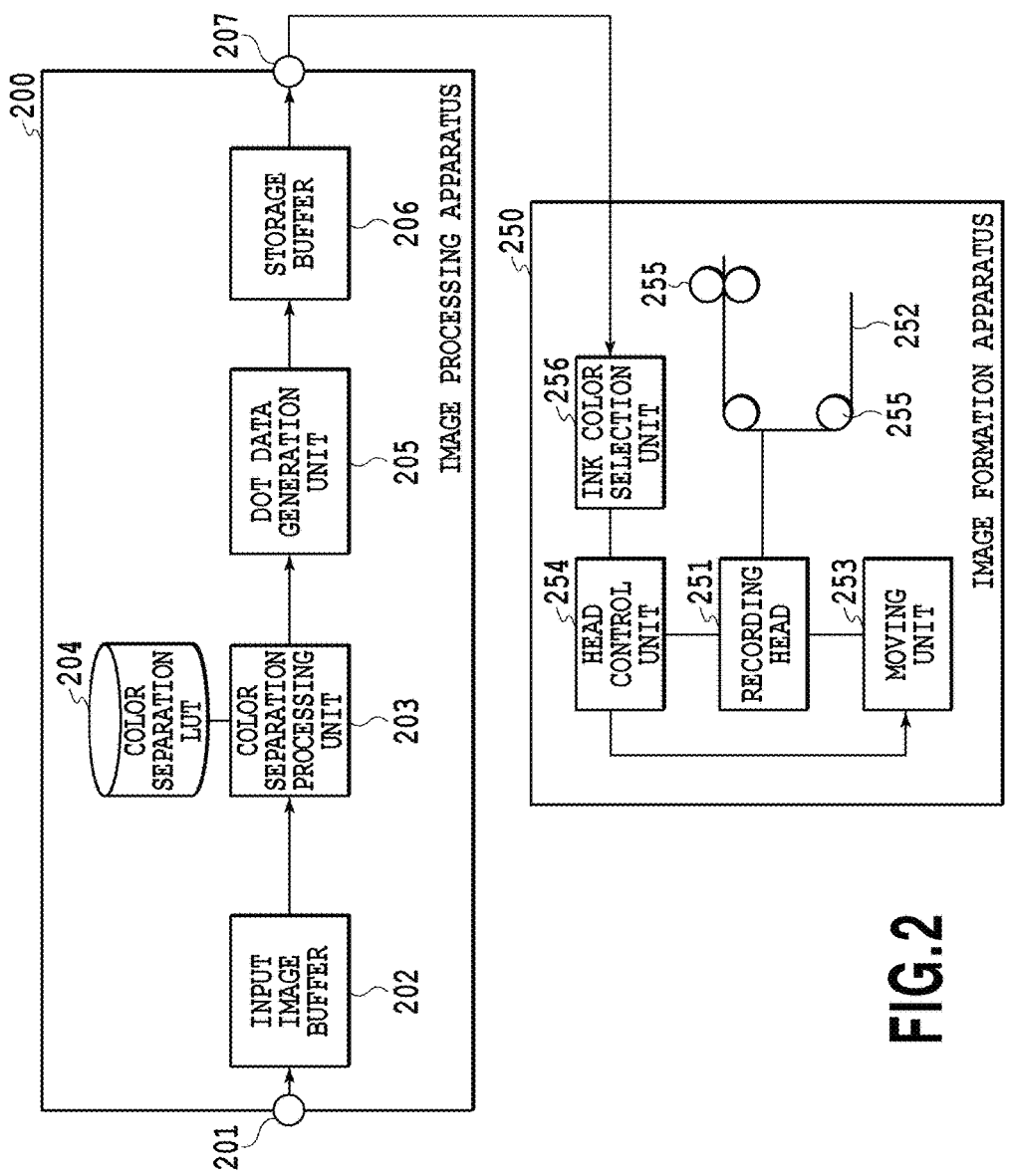
FIG. 2 is a block diagram illustrating a configuration of an image processing apparatus and an image formation apparatus.

FIG. 2 is a block diagram showing a configuration of an image processing apparatus and an image formation apparatus which can be employed in Embodiment 1. In FIG. 2, the image processing apparatus 200 and the image formation apparatus 250 are connected to each other by an interface or a circuit. A system including the image processing apparatus 200 and the image formation apparatus 250 are referred to as image formation system. The image processing apparatus 200 is, for example, a printer driver installed in a general personal computer. In this case, units in the image processing apparatus 200 to be described below are implemented by causing the computer to execute a predetermined program. Note that a configuration in which the image processing apparatus 200 is included in the image formation apparatus 250 may also be employed.

The image processing apparatus 200 stores color image data of a print target which is inputted from an input terminal 201 (hereafter, referred to as color input image data) in an input image buffer 202. The color input image data is formed of three color components of red (R), green (G), and blue (B)

A color separation processing unit 203 separates the stored color input image data into pieces of data for ink application amounts of color material colors included in the image formation apparatus 250. The color separation processing unit 203 refers to a color separation lookup table (LUT) 204 in this color separation processing. The color material colors in the embodiment are five colors including, in addition to four colors of cyan (C), magenta (M), yellow (Y), and black (K), a color of a transparent ink or an ink with less density (T) than the CMYK inks.

A dot data generation unit 205 converts the data for the ink application amounts of the color material colors into dot data for each scan operation. The dot data is data describing positions where the recording is to be performed in each scan operation for each ink color.

A storage buffer 206 stores the dot data for each scan operation for each ink color. The stored dot data for each scan operation is outputted to the image formation apparatus from an output terminal 207.

The image formation apparatus 250 vertically and horizontally moves a recording head 251 relative to a recording medium 252, based on the dot data for each scan operation for each ink color which is received from the image processing apparatus 200, and thereby forms an image on the recording medium 252. In this example, the recording head 251 is an inkjet recording head and has one or more recording elements (nozzles). A head control unit 254 controls a moving unit 253 and causes the moving unit 253 to move the recording head 251. Moreover, a conveying unit 255 conveys the recording medium under the control of the head control unit 254. In this case, the amount of ink ejected from the recording head is set to about 2 to 4 picoliters so that the diameter of a dot on the recording medium can be about 20 µm to 30 µm.

An ink color selection unit 256 selects an ink corresponding to the dot data to be printed, out of the inks mounted in the recording head 251, based on the dot data for each scan operation for each ink color which is generated by the image processing apparatus 200.

Figure 3A:
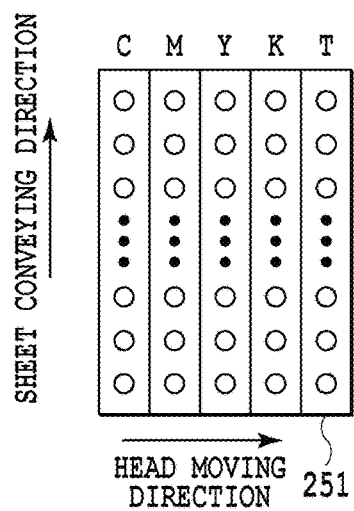
FIGS. 3A and 3B are diagrams illustrating configurations of a recording head.
Figure 3B:
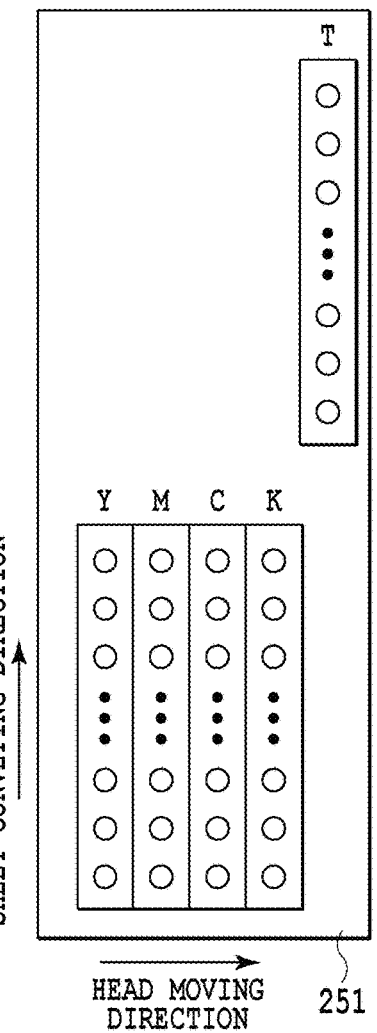

FIGS. 3A and 3B are diagrams illustrating configuration examples of the recording head 251. In the embodiment, as described above, the five inks including, in addition to the four inks of cyan (C), magenta (M), yellow (Y), and black (K), the transparent ink or the ink with less density (higher transmittance) (T) than the CMYK inks are mounted in the recording head 251.

Although FIG. 3A shows a configuration where the nozzles of each color are arranged in a single line in a direction (main scanning direction) in which the recording medium is conveyed to simply the description, the number and arrangement of the nozzles are not limited to those in this example. For example, the recording head 251 may include nozzles which eject an ink of the same density and the same color at different ejection amounts, or include multiple lines of nozzles which eject the ink at the same ejection amount. Moreover, a configuration in which nozzles are arranged in zigzag may be employed. Furthermore, although the nozzles of the respective ink colors at the same position in the arrangement order are installed at the same position in the sub-scanning direction in FIG. 3A, the nozzles may be installed at different positions in the sub-scanning direction as illustrated in FIG. 3B.

In the embodiment, an example is given in which the nonuniformity (variation) of the thickness in the transparent ink is increased with the roughness on the image surface kept small by using the cyan ink and the transparent ink, and the coloring of the specular reflection is thereby reduced with the gloss uniformity (particularly, the gloss clarity) being improved. Note that the coloring of the specular reflection refers to coloring of the specular reflection caused by both of the bronzing and the thin-film interference phenomenon.

Figure 4A:
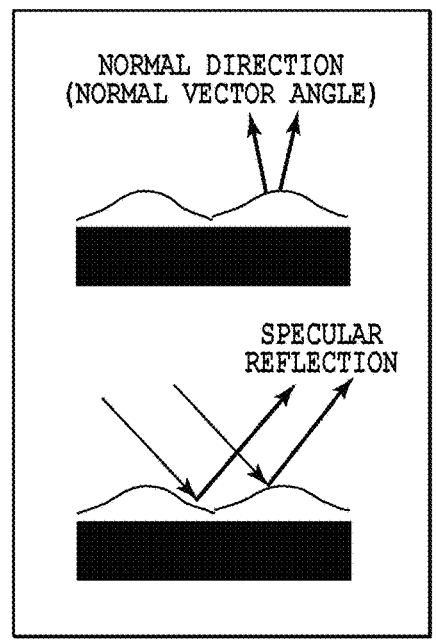
FIGS. 4A and 4B are views illustrating relationships between a specular reflection direction of light and a normal direction of the transparent ink to an image surface.
Figure 4B:
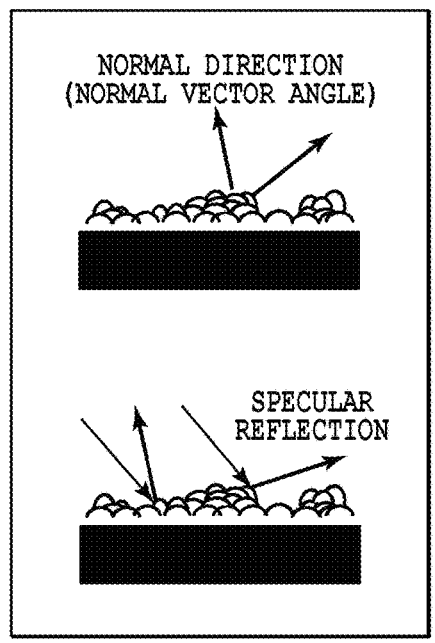

Specifically, at least part of the transparent ink is fixed in the layer above the cyan ink. In this case, the nonuniformity (variation) of the thickness in the ink with high transmittance (transparent ink) is increased with the inclination of the normal direction to the image surface kept small. This reduces the coloring of specular reflection while improving the gloss uniformity (particularly, the gloss clarity). In order to increase the nonuniformity (variation) of the thickness while keeping the inclination of the normal direction to the image surface small, the film of the transparent ink needs to have a structure with a relatively long cycle as illustrated in FIG. 4A. Although the examples of FIGS. 4A and 4B both have substantially the same degree of thickness nonuniformity (variation), in the example of FIG. 4B which has a structure of a relatively short cycle, the direction of reflection varies due to large variation in the inclination of the normal direction to the surface depending on position. This decreases the gloss uniformity, particularly the gloss clarity which is the degree of clarity of gloss. Meanwhile, since the example of FIG. 4A has a structure with a longer cycle than that in the example of FIG. 4B, the inclination of the normal direction to the surface is small. This maintains the gloss uniformity, particularly the gloss clarity.

The inventor performed in advance analysis on the relationship between the angle of the normal direction and the gloss clarity which is the degree of clarity of gloss, by means of subjective evaluation (sensory evaluation). As a result of this analysis, it was found that excellent gloss clarity can be maintained as long as the normal direction to the surface is 0.5 degrees or less.

Moreover, the inventor performed in advance analysis on the relationship between the nonuniformity of the thickness in the transparent ink and the gloss coloring due to the thin-film interference phenomenon, by means of subjective evaluation (sensory evaluation). As a result of this analysis, it was found that various types of coloring with a shape of Newton's ring occur in a case where the difference between the minimum value and the maximum value in distribution of the thickness is 180 nm (nanometers) or more. By macroscopically observing these various types of coloring, it was found that the various types of coloring cancel each other out and excellent gloss coloring is thereby obtained (specular reflection becomes white). Note that, although the aforementioned difference is 180 nm or more in this analysis, the difference may be 180 nm or less as long as the coloring can be reduced such that the specular reflection becomes white. For example, in the aforementioned analysis, it was found that the effect of the specular reflection becoming white can be obtained at a difference of 60 nm or more. Moreover, the upper limit of the difference in theory is 1440 nm in a case where the frequency (cycle) of the specular reflection coloring is 320 μm.

Figure 5:
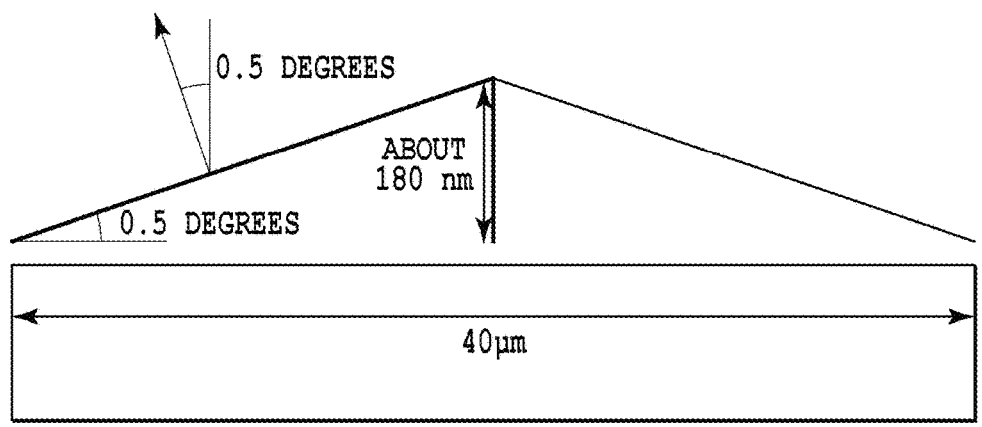
FIG. 5 is a diagram illustrating a model of a cycle at which the normal direction (normal vector angle) to the image surface is set to 0.5 degrees and a thickness distribution difference is set to 180 nm.

An example of analysis of a structure of the transparent ink with excellent gloss clarity and gloss coloring based on the aforementioned analysis is illustrated in FIG. 5. FIG. 5 illustrates an example in which the transparent ink thickness distribution has a shape of a sawtooth and conditions for the cycle of thickness distribution at which the angle of the normal direction to the image surface is set to 0.5 degrees and the thickness distribution difference is set to about 180 nm are verified. It is found from FIG. 5 that the cycle of 40 μm (micrometers) or more is required to achieve a thickness distribution difference of about 180 nm. Accordingly, the range of the cycle of the thickness variation in the transparent ink is set to 40 μm or more to achieve both of an improvement in the gloss uniformity (particularly, the gloss clarity) and reduction in the specular reflection coloring.

Figure 6:
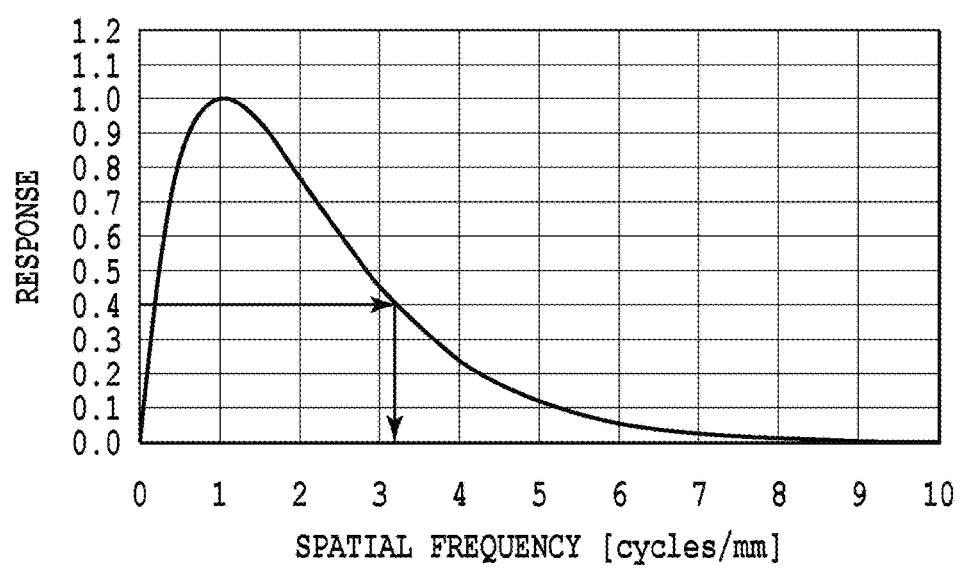
FIG. 6 is a graph showing a spatial frequency characteristic of vision.

However, the range of the cycle of the thickness variation in the transparent ink simply being 40 μm or more is not sufficient. The specular reflection coloring, although having a relatively low contrast, can be visually detected in a case where the cycle of the structure is long. Accordingly, the cycle of the structure is preferably set to such a cycle that the specular reflection coloring cannot be detected, based on the special frequency response of vision (periodic response of vision). Since the spatial frequency response of vision is sensitive at low frequency (long cycle) as illustrated in FIG. 6, the cycle of the structure needs to be set to high frequency (short cycle).

In view of this, the inventor performed in advance an experiment on whether or not the specular reflection coloring can be detected at certain frequencies (cycles). As a result, it was found that, in a case where the special frequency is about 3.1 [cycles/mm] or more, the specular reflection coloring cannot be detected at an observation distance of 300 mm (millimeter) which is the distance of distinct vision. The frequency of about 3.1 [cycles/mm] or more converted into cycle is a cycle of 320 μm or less.

Based on the aforementioned analysis and experiment results, the cycle of the thickness variation in the transparent ink is preferably set within a range of 40 μm to 320 μm to reduce the specular reflection coloring while improving the gloss uniformity (particularly, the gloss clarity).

Meanwhile, the aforementioned control is not performed for the inks with low transmittance such as the cyan ink and the black ink, because decrease in graininess becomes easily visible in a case where the cycle of the thickness variation is increased.

Figure 7:
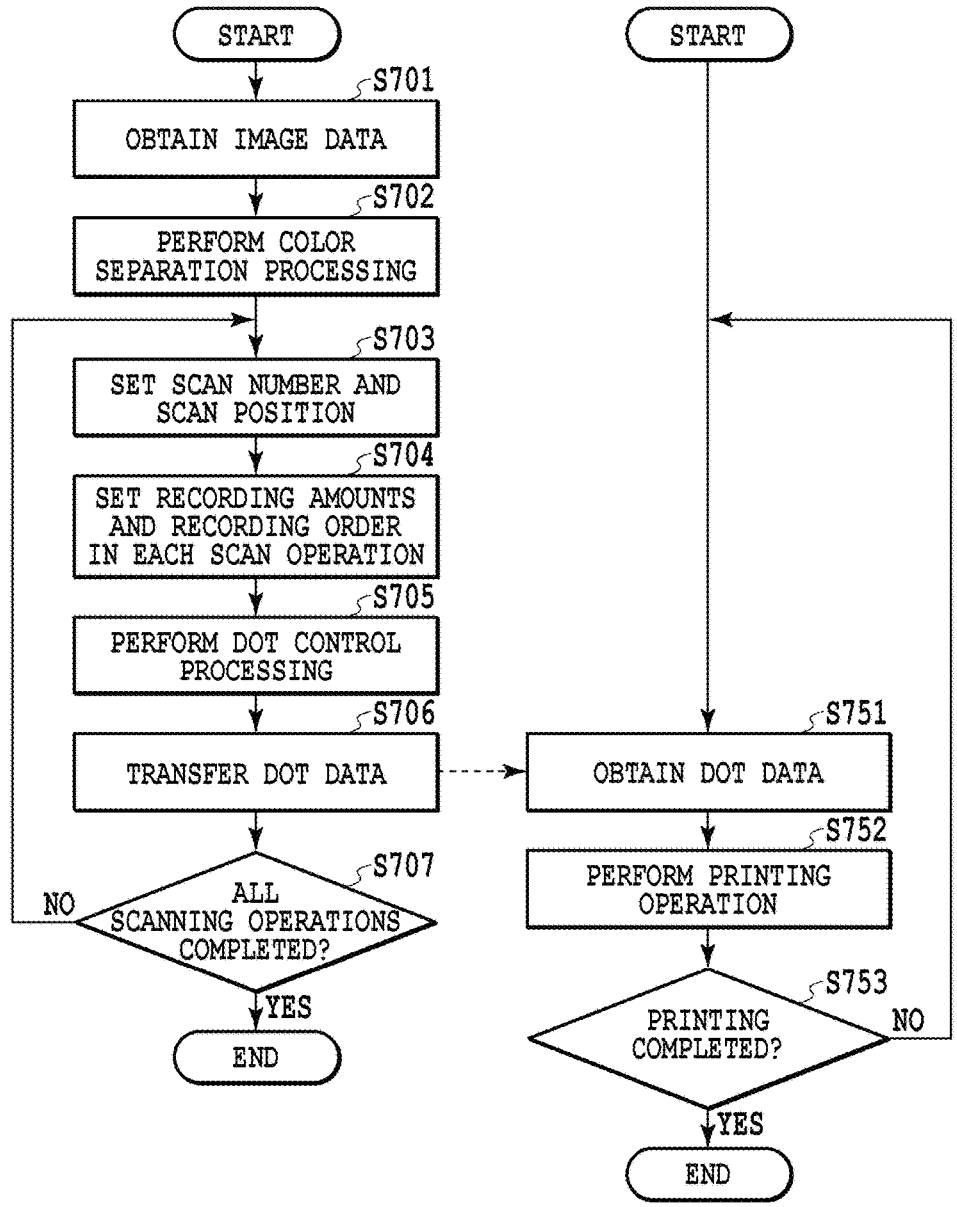
FIG. 7 is a diagram showing a flow of processing in Embodiment 1.

A control method and a processing method in the embodiment for setting the cycle of the thickness variation within the aforementioned range is described below. First, the flowchart of FIG. 7 is used to describe the processing in the image processing apparatus 200 and the image formation apparatus 250 which can be employed in the embodiment. Note that resolution in the control and processing in the embodiment is assumed to be 1200 dpi (the size of one pixel is about 20 μm square). In the flowchart of FIG. 7, the processing from steps S701 to S707 is performed in the image processing apparatus 200 while the processing from steps S751 to S753 is performed in the image formation apparatus 250. The flowchart illustrated in FIG. 7 is implemented by, for example, a CPU executing a program which is stored in a not-illustrated ROM or HDD and which is temporarily loaded into a RAM.

First in step S701, the image processing apparatus 200 receives multi-tone input image data at the input terminal 201 and obtains the input image data. The obtained input image data is stored in the input image buffer 202. The input image data is formed of three color components of red (R), green (G), and blue (B).

In step S702, the color separation processing unit 203 separates the input image data by using the color separation LUT 204 such that the input image data are converted from RGB values to color values of CMYK and the transparent ink T. In the embodiment, each piece of pixel data subjected to the color separation processing is handled as a floating point value of 0 to 255. However, conversion to a greater number of tones may be performed.

Figure 8:
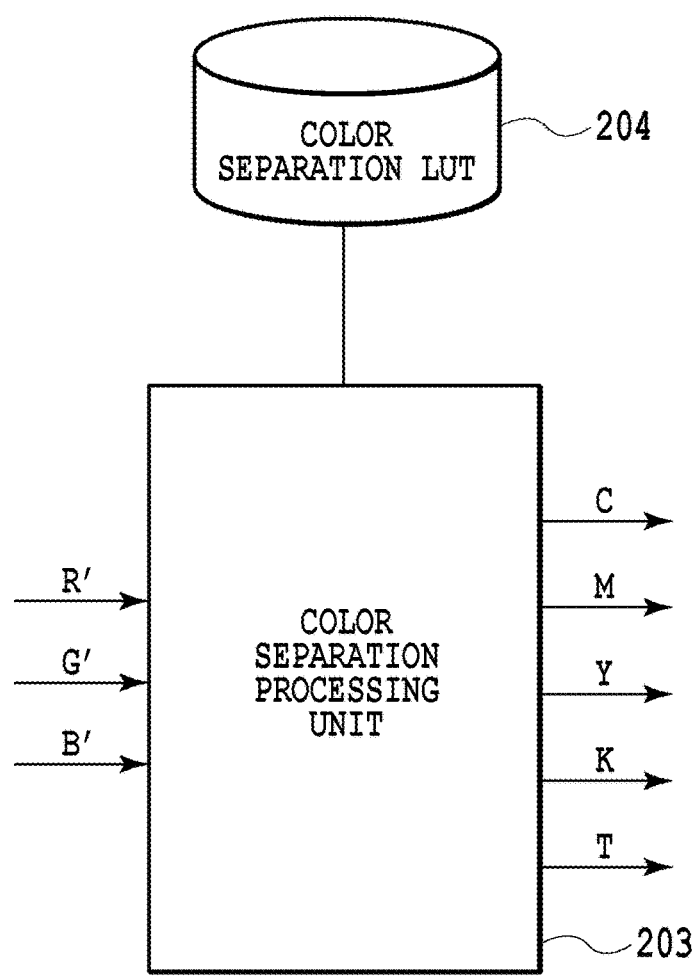
FIG. 8 is a diagram for explaining an overview of color separation processing.

As described above, the recording head 251 in the embodiment holds five types of inks. Accordingly, the RGB color input image data is converted to image data of five planes of CMYKT planes. FIG. 8 illustrates input and output of the data in the color separation processing unit 203. The inputted pieces of image data of the respective colors of R, G, and B are converted to pieces of color-separated image data of the respective colors of CMYKT with reference to the color separation LUT 204, as shown in the following formulae.

$$C = C\_LUT\_3D(R, G, B) \quad (1)$$

$$M = M\_LUT\_3D(R, G, B) \quad (2)$$

$$Y = Y\_LUT\_3D(R, G, B) \quad (3)$$

$$K = K\_LUT\_3D(R, G, B) \quad (4)$$

$$T = T\_LUT\_3D(R, G, B) \quad (5)$$

A function defined on the right side of each of the formulae (1) to (5) corresponds to the content of the color separation LUT 204. The color separation LUT 204 determines the output values of the respective inks from the three input values of red, green, and blue. In the embodiment, since the recording head 251 is configured to include five types of inks of CMYKT, the LUT configuration is such that five output values are obtained from three input values. The color separation processing in the embodiment is completed by the processing described above.

Figure 9:
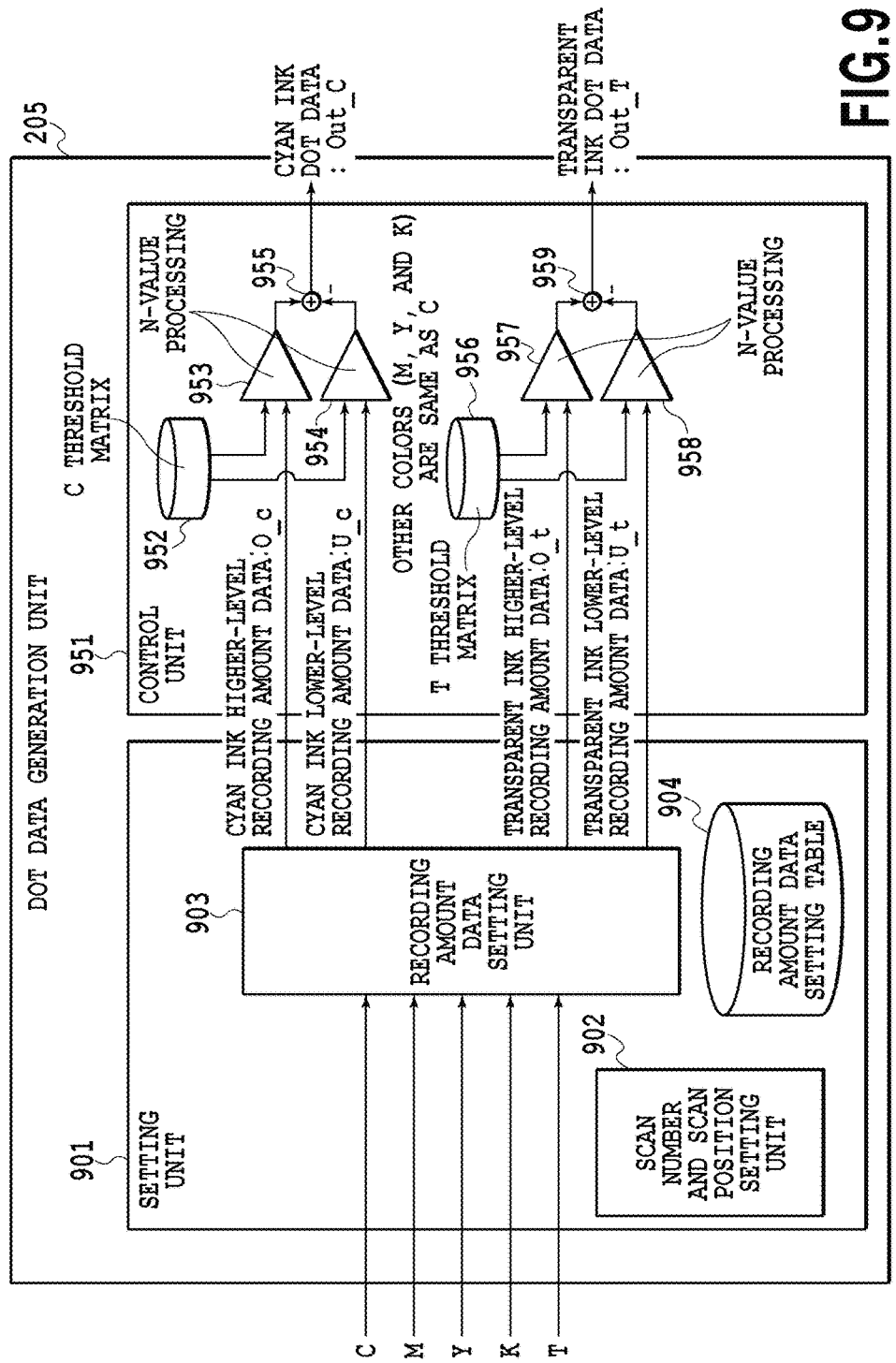
FIG. 9 is a diagram illustrating details of a dot data generation unit in Embodiment 1.

In the following steps S703 to S707, the processing is performed for each color. Here, description is given of an example for the cyan ink (C) and the transparent ink (T). However, similar processing is performed for the other three types of color materials of magenta (M), yellow (Y), and black (K). Steps S703 to S705 are processing performed in the dot data generation unit 205. FIG. 9 is a diagram illustrating details of the dot data generation unit 205. The dot data generation unit 205 includes a setting unit 901 and a control unit 951.

In step S703, the dot data generation unit 205 sets a scan number and a scan position. Specifically, a scan number and scan position setting unit 902 included in the setting unit 901 of the dot data generation unit 205 sets a scan number k and cut (k) indicating a Y coordinate which is a scan position in the color separation data. cut (K) is a scan position in the color separation data for the scan number k and corresponds to a nozzle upper end coordinate. An initial value of the scan number k is 1 and is incremented by one for every processing loop. Specifically, the processing from steps S703 to S707 is processing for one scan number k. The value of k is updated in step S707 to be described later and the same processing is repeated.

Description is given of a method of setting the scan position Y coordinate cut (k) in the color separation data in an example where the recording head includes 16 rows of nozzles and four-pass printing is performed in which an image is formed by performing four scan operations for one main-scanning recording region in an image.

Figure 10A:
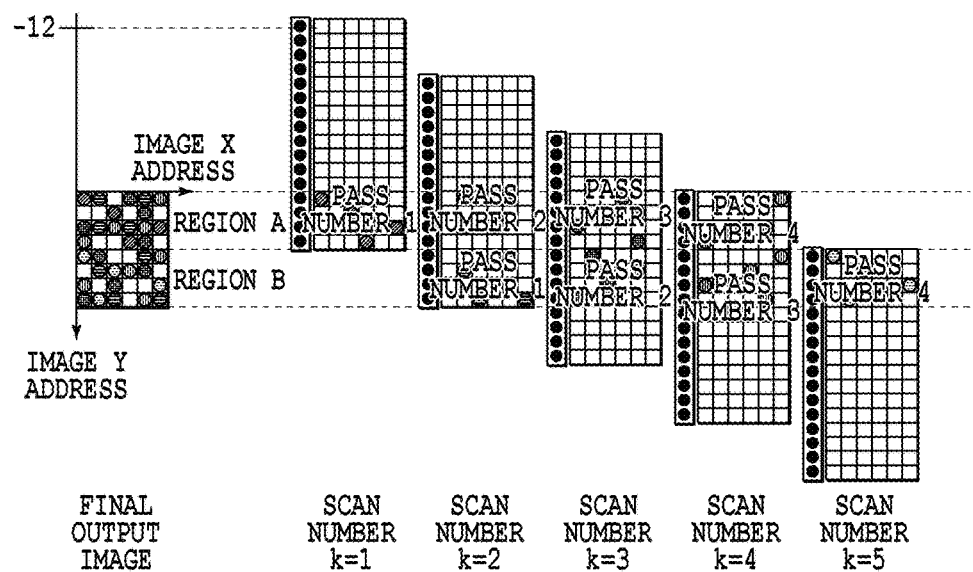
FIGS. 10A and 10B are diagrams illustrating examples of multi-pass printing.

Generally, in the four-pass printing, as illustrated in FIG. 10A, in an operation in the scan number of the initial value (k=1), the image is formed by using only a quarter of nozzles in a lower end portion, and in an operation in the scan number k=2, the image is formed after sending the sheet by an amount corresponding to a quarter of the length of a set of nozzles, from a position in the scan number k=1. Then, in an operation in the scan number k=3, the image is formed after sending the sheet by an amount corresponding to a quarter of the length of the set of nozzles, from a position in the scan number k=2. Such image formation and sheet sending is repeated and a final output image is thereby formed. Accordingly, in the scan number k=1, the scan position cut (1) corresponding to the nozzle upper end coordinate satisfies cut (1)=−12. In k=4, the scan position cut (4) corresponding to the nozzle upper end coordinate satisfies cut (4)=0.

In a case where the scan position cut (k) in the aforementioned color separation data of one ink color is generalized, the following formula is given:

$$\mathrm{cut}(k) = -Nzzl + (Nzzl/\mathrm{Pass}) \times k \quad (6)$$

where Nzzl is the number of rows of nozzles, Pass is the number of passes, and k is the scan number.

FIG. 10A is a diagram illustrating an example of the image formation in the four pass printing in the case where all of the nozzles are used. Note that the image formation with the same sheet feeding amount (quarter of the length of the set of nozzles) as that in the example described above can be performed by using not all of the nozzles. For example, in the example of FIG. 10B, an image is formed by arranging dots in the same way as in FIG. 10A by using only the nozzles in a lower half portion, while sending the sheet by an amount corresponding to a quarter of the length of the set of nozzles. However, since the number of the used nozzles is half of that in FIG. 10A while the sheet feeding amount is the same as that in FIG. 10A, the image is formed substantially in two-pass printing. Accordingly, the amount of recording (number of dots) per one pass is doubled. Furthermore, in the example of FIG. 10B, the recording order is such that the image is formed in recording of the first two scan operations out of the four scan operations.

Next, in step S704, the setting unit 901 sets the recording amounts of the respective nozzles and the recording order of the nozzles in each scan operation. Specifically, a recording amount data setting unit 903 of the setting unit 901 sets recording amount data for each scan operation which indicates the recording amounts of the respective nozzles and the recording order of nozzles in each scan operation, by using a recording amount data setting table 904. In other words, the recording amount data setting unit 903 sets the recording amount data indicating the recording amounts of the respective nozzles and the recording order of nozzles in a k-th scan operation.

Figure 10B:
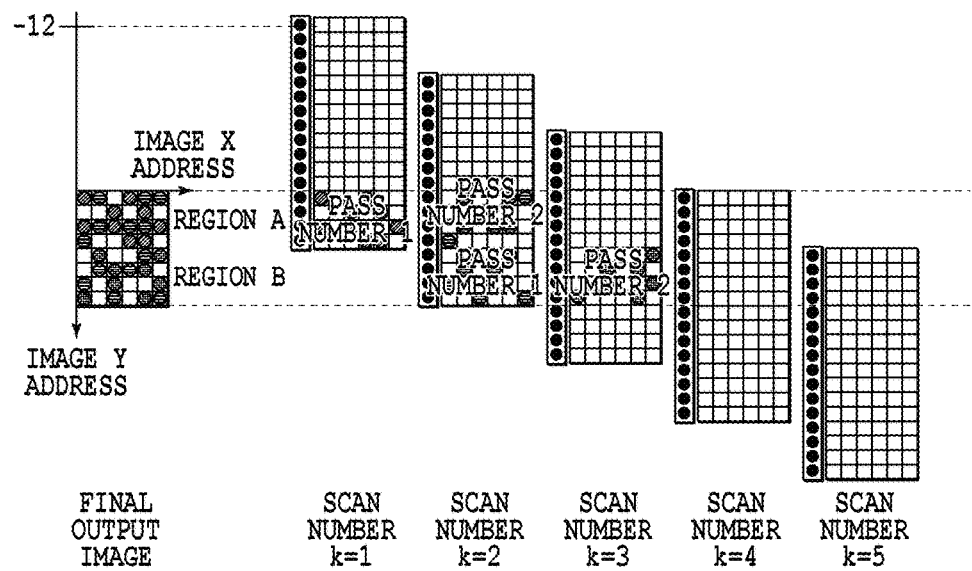

In the embodiment, description is given of an example of setting the recording order and the recording amounts in a situation where not all of the nozzles are used as illustrated in FIG. 10B. Specifically, the color ink is first applied by using the nozzles in the lower half portion which are used in a former scan operation, and then the transparent ink is applied by using the nozzles in an upper half portion which are used in a latter scan operation. At least part of the transparent ink is thereby fixed in the layer above the color ink.

Next, description is given of a method of setting the recording amounts and the recording order such that the color ink is applied first by using the nozzles in the lower half portion and then the transparent ink is applied by using the nozzles in the upper half portion as described above. In the embodiment, in a case where the paper feeding amount is equal to a quarter of the length of the set of nozzles, ink value division ratios as illustrated in FIGS. 11A and 11B are given. The ink value division ratio refers to Duty division ratio. FIG. 11A illustrates the ink value division ratio of the cyan ink (C) and FIG. 11B illustrates the ink value division ratio of the transparent ink (T). The vertical axes of FIGS. 11A and 11B represent the nozzle position and the horizontal axes of FIGS. 11A and 11B represent the ink value division ratio. In the embodiment, consideration is given to the ink value division ratios in the case where the cyan ink is ejected from the nozzles in the lower half portion and the transparent ink is ejected from the nozzles in the upper half portion.

For example, in FIGS. 11A and 11B, $D\_c(3)$ indicates the ink value division ratio of the cyan ink in a nozzle at a nozzle position 3, and $D\_t(3)$ indicates the ink value division ratio of the transparent ink in a nozzle at a nozzle position 3. Note that a nozzle position at an upper end is 0. In the ink value division ratio of the cyan ink, values are set for every four nozzles such that $D\_c(3)$, $D\_c(7)=0.0$ and $D\_c(11)$, $D\_c(15)=0.5$ are satisfied, and values for 16 nozzles obtained by discontinuously connecting these points are shown. In the ink value division ratio of the transparent ink, values are set for every four nozzles such that $D\_t(3)$, $D\_t(7)=0.5$ and $D\_t(11)$, $D\_t(15)=0.0$ are satisfied, and values for 16 nozzles obtained by discontinuously connecting these points are shown.

The values of $D\_c(3)$, $D\_c(7)$, $D\_c(11)$, and $D\_c(15)$ and the values of $D\_t(3)$, $D\_t(7)$, $D\_t(11)$, and $D\_t(15)$ are set as described below such that the total of each set of values is 1.0.

$$D\_c(3)+D\_c(7)+D\_c(11)+D\_c(15)=1.0 \quad (7)$$

$$D\_t(3)+D\_t(7)+D\_t(11)+D\_t(15)=1.0 \quad (8).$$

The ink value division ratios of the cyan ink in FIGS. 11A and 11B are $D\_c(3)=D\_c(7)=0.0$ and $D\_c(11)=D\_c(15)=0.5$. This means that the cyan ink is applied at a ratio of 0.5 by using the nozzles in the lower half portion. In other words, the ink amount base on the two-pass printing in which printing is performed two times on the same sheet surface region at the ink value division ratio of 0.5 is set for the color separation data.

Moreover, the ink value division ratios of the transparent ink in FIGS. 11A and 11B are $D\_t(3)=D\_t(7)=0.5$ and $D\_t(11)=D\_t(15)=0.0$. This means that the transparent ink is applied at a ratio of 0.5 by using the nozzles in the upper half portion. In other words, the ink amount in the two-pass printing in which printing is performed two times on the same sheet surface region at the ink value division ratio of 0.5 is set for the color separation data. Regarding the ink value division ratios, functions related to a nozzle position ny can be expressed as follows, where D_c is the ink value division ratio of the cyan ink and D_t is the ink value division ratio of the transparent ink:

$$D\_c(ny)=0.0 \quad (9)$$

$$D\_t(ny)=0.5 \quad (10)$$

(where ($0 \leq ny < Nzzl/2$) is satisfied)

$$D\_c(ny)=0.5 \quad (11)$$

$$D\_t(ny)=0.0 \quad (12)$$

(where ($Nzzl/2 \leq ny < Nzzl$) is satisfied).

In the embodiment, the ink value division ratios of the other three colors (YMK) are referred to as D_y, D_m, and D_k, and the same ink value division ratio as D_c are assigned to D_y, D_m, and D_k. In other words, the ink amount based on the two-pass printing using the nozzles in the lower half portion is assumed to be set for the other three colors.

Figure 12:
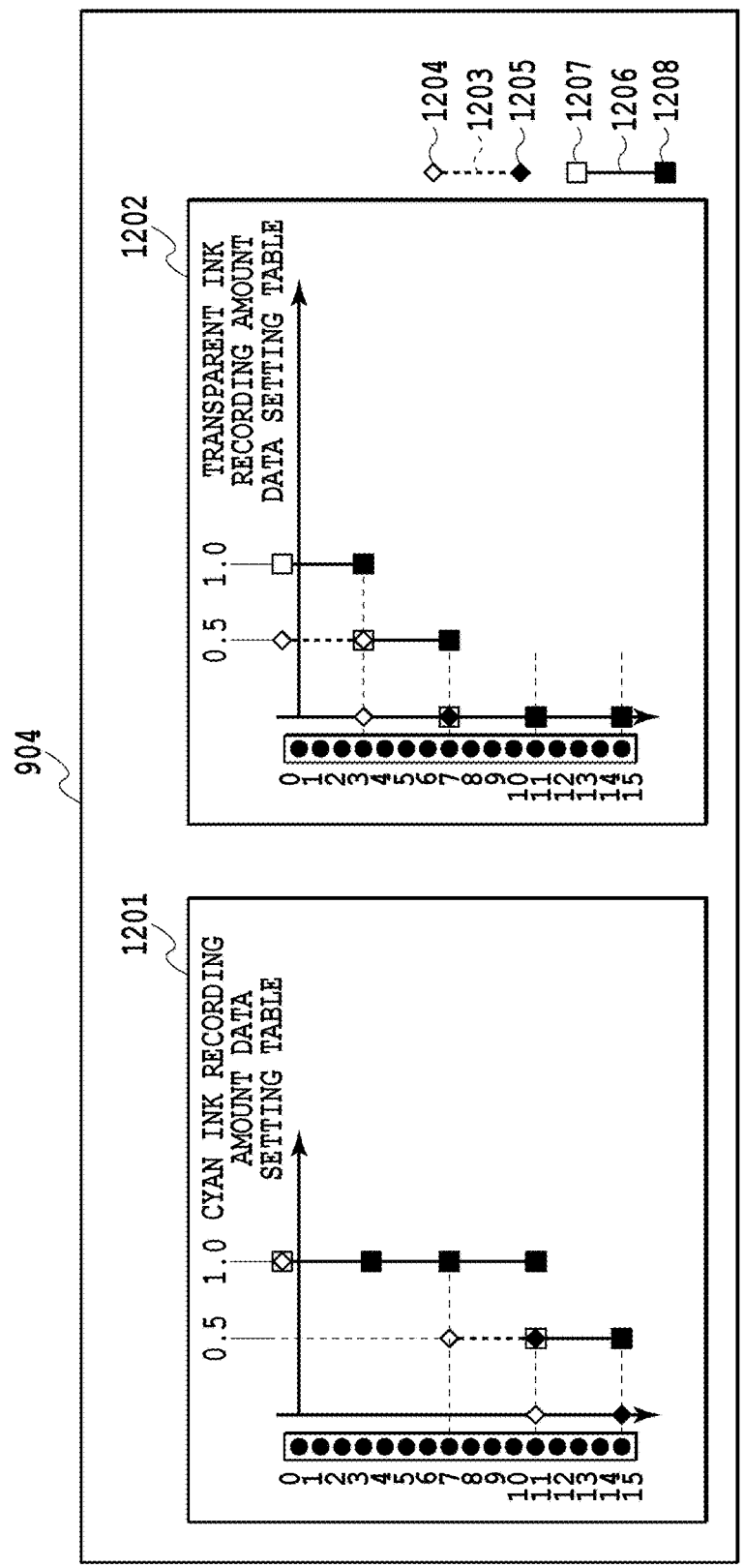
FIG. 12 is a diagram illustrating a recording amount data setting table.

In a case where the ink value division ratios in the aforementioned formulae (9) to (12) are set, relationships between the nozzle positions and the recording amount data setting values are set in the recording amount data setting table 904 as illustrated in FIG. 12. The recording amount data setting table 904 is a table set based on the aforementioned ink value division ratios, and the ink recording amount data for each nozzle in each scan operation can be derived by integrating the value of the color separation data and the value of the recording amount data setting table 904 as will be described later. In the embodiment, two types of data of higher-level recording amount data and lower-level recording amount data are derived as the ink recording amount data for each nozzle in each scan operation as will be described later. Then, N-value processing of each piece of ink recording amount data is performed in N-value processing (halftone processing) to be described later. Thereafter, dot data is generated by using data obtained by subtracting lower-level dot data corresponding to the lower-level recording amount data from higher-level dot data corresponding to the higher-level recording amount data. The reason for performing such processing is to prevent dots from being formed at the same position in each scan operation as much as possible in a case where recording for a certain region is performed in multiple scan operations. In the embodiment, the cycle of the thickness variation in the transparent ink is set within the range of 40 μm to 320 μm as described above. Accordingly, the processing of forming the dots such that the cycle of the thickness variation in one scan operation is set within the range of 40 μm to 320 μm is performed while control is performed such that dots are prevented from being formed at the same position as much as possible in each scan operation.

Description is given of details of the recording amount data setting table 904 for setting the higher-level recording amount data and the lower-level recording amount data which are bases of the higher-level dot data and the lower-level dot data. In a recording amount data setting table 1201 of the cyan ink in FIG. 12, the vertical axis represents the nozzle position and the horizontal axis represents the value in the recording amount data setting table. In a recording amount data setting table 1202 of the transparent ink, the vertical axis represents the nozzle position and the horizontal axis represents the value of the recording amount data setting table. Moreover, in FIG. 12, two types of tables of a lower-level table for the lower-level recording amount data and a higher-level table for the higher-level recording amount data are set in the recording amount data setting table of the cyan ink. In FIG. 12, the lower-level table is data indicated by a dot line 1203, a white rhombus 1204, and a black rhombus 1205. The higher-level table is data indicated by a solid line 1206, a white square 1207, and a black square 1208. Moreover, the recording amount data setting table including the higher-level table and the lower-level table is set in a similar way for the transparent ink. Here, the white rhombus 1204 and the white square 1207 are examples not including values corresponding to these symbols, and the black rhombus 1205 and the black square 1208 are examples including the values corresponding to these symbols. For example, the lower-level table at the nozzle row number 7 in the cyan ink recording amount data setting table 1201 indicates that the value is not 0.5 but 1.0.

The lower-level table and the higher-level table of the cyan ink recording amount data setting table 904 illustrated in FIG. 12 are generated under the following rules, where the lower-level table and the higher-level table are expressed as U_C_LUT (ny) and O_C_LUT (ny), respectively. As described above, D_c is the ink value division ratio, ny is the nozzle position, and Nzzl is the number of rows of nozzles. Note that, in a case where the value in the parentheses of D_c( ) exceeds the number of rows of nozzles, the value is set to 0.

$$U\_C\_LUT(ny)=D\_c(ny+Nzzl/4)+D\_c(ny+2 \times Nzzl/4)+D\_c(ny+3 \times Nzzl/4) \quad (13)$$

$$O\_C\_LUT(ny)=D\_c(ny)+D\_c(ny+Nzzl/4)+D\_c(ny+2 \times Nzzl/4)+D\_c(ny+3 \times Nzzl/4) \quad (14)$$

(where ($0 \leq ny < Nzzl$) is satisfied).

In other words, the value of the lower-level table U_C_LUT of the cyan ink is:

(in a case of $0 \leq ny < 4$) $U\_C\_LUT(ny)=1.0$ (in a case of $4 \leq ny < 8$) $U\_C\_LUT(ny)=1.0$ (in a case of $8 \leq ny < 12$) $U\_C\_LUT(ny)=0.5$ (in a case of $12 \leq ny < 16$) $U\_C\_LUT(ny)=0.0$ \quad (15).

Meanwhile, the value of the higher-level table O_C_LUT of the cyan ink is:

(in a case of $0 \leq ny < 4$) $O\_C\_LUT(ny)=1.0$ (in a case of $4 \leq ny < 8$) $O\_C\_LUT(ny)=1.0$ (in a case of 8≤ny<12)O_C_LUT(ny)=1.0

(in a case of 12≤ny<16)O_C_LUT(ny)=0.5    (16).

As described above, in a case of generating the dot data, the value obtained by subtracting the lower-level data from the higher-level data is used. Specifically, in a case where these tables of the cyan ink are used, the dot data is 0 at the nozzle row numbers 0 to 7. In other words, in the data of the cyan ink, no dots are formed by the nozzles in the upper end portions. Meanwhile, at the nozzle row numbers 8 to 15 in the lower end portions, the color separation data is converted to the ink recording amount data at a value of 0.5 which is the set value of the ink value division ratio. In this case, the lower-level data is subtracted from the higher-level data to prevent a dot from being formed at the same position as a dot formed in the previous scan operation.

The lower-level table U_T_LUT (ny) and the higher-level table O_T_LUT(ny) of the transparent ink are generated in a similar way.

Specifically, the value of the lower-level table U_T_LUT of the transparent ink is:

(in a case of 0≤ny<4)U_T_LUT(ny)=0.5

(in a case of 4≤ny<8)U_T_LUT(ny)=0.0

(in a case of 8≤ny<12)U_T_LUT(ny)=0.0

(in a case of 12≤ny<16)U_T_LUT(ny)=0.0    (17).

Meanwhile, the value of the higher-level table O_T_LUT of the transparent ink is:

(in a case of 0≤ny<4)O_T_LUT(ny)=1.0

(in a case of 4≤ny<8)O_T_LUT(ny)=0.5

(in a case of 8≤ny<12)O_T_LUT(ny)=0.0

(in a case of 12≤ny<16)O_T_LUT(ny)=0.0    (18).

Since the dots of the transparent ink are formed by the nozzles in the upper end portion, values at the nozzle row numbers 8 to 15 in the lower end portions which are used in a preceding pass are set to 0 in both of the higher-level table and the lower-level table.

In step S704, the recording amount data setting unit 903 converts each piece of image data subjected to color separation to the higher-level recording amount data and the lower-level recording amount data by using the recording amount data setting table 904.

Figure 13:
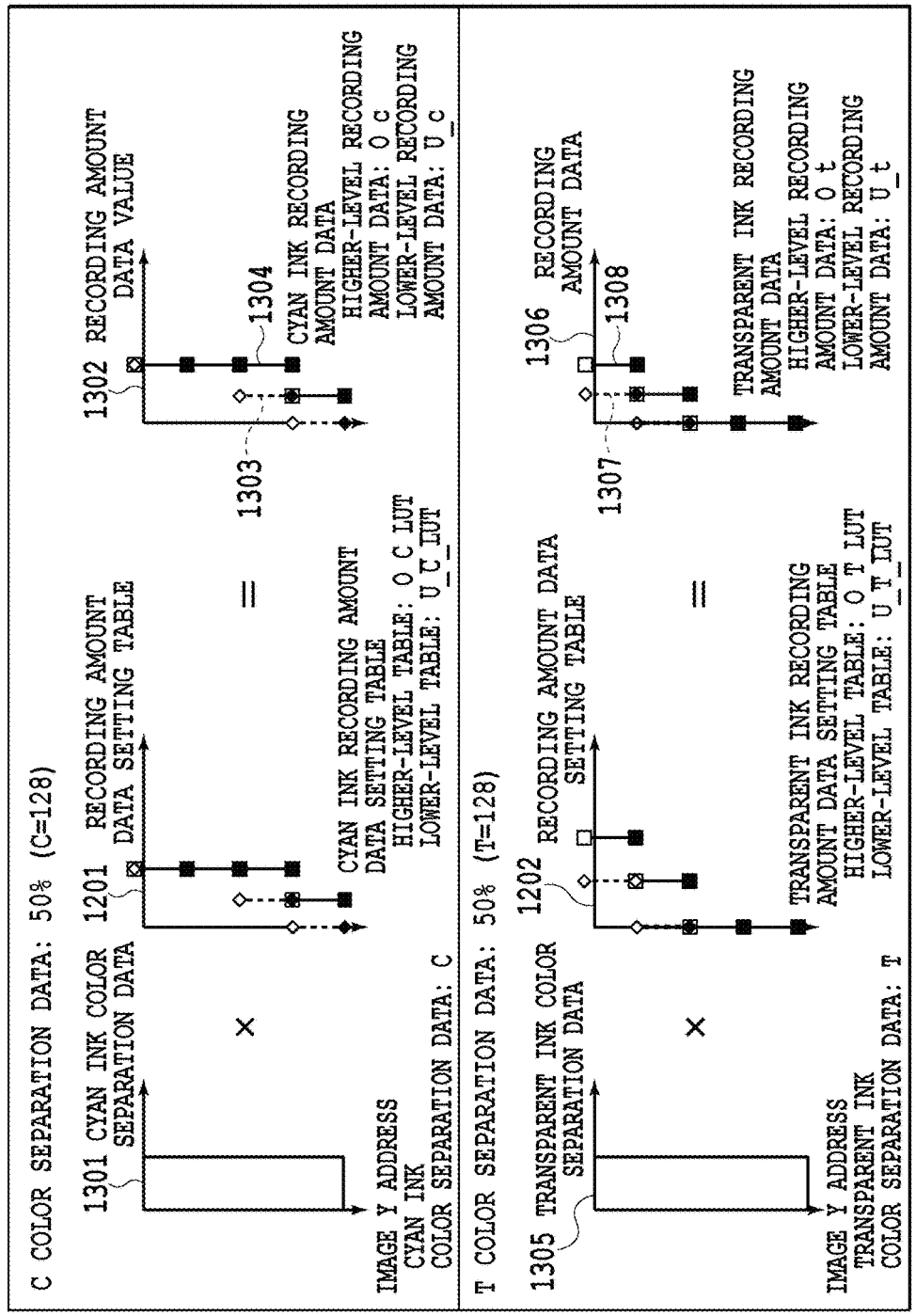
FIG. 13 is a diagram illustrating an overview of recording amount data setting processing.

A method of determining the higher-level recording amount data and the lower-level recording amount data is described by using FIG. 13. In this example, the value of the color separation data of the cyan ink is assumed to be 128 (128/255≈50%) at all addresses (pixels). Moreover, the value of the color separation data of the transparent ink at least part of which is to be fixed in the layer above the cyan ink is also assumed to be 128 (128/255≈50%) in all addresses (pixels). The image data T of the transparent ink subjected to color separation is a value converted by using formula (5).

As illustrated in FIG. 13, recording amount data 1302 of the cyan ink for each nozzle in the k-th scan operation in the case where cyan ink color separation data 1301 is given is obtained by integrating the value of the color separation data 1301 and the recording amount data setting table 1201. In FIG. 13, the recording amount data 1302 of the cyan ink includes lower-level recording amount data U_c 1303 and higher-level recording amount data O_c 1304. Moreover, recording amount data 1306 of the transparent ink for each nozzle in the k-th scan operation in the case where transparent ink color separation data 1305 is given is obtained by integrating the value of the transparent ink color separation data 1305 and the recording amount data setting table 1202. In FIG. 13, the recording amount data 1306 of the transparent ink includes lower-level recording amount data U_t 1307 and higher-level recording amount data O_t 1308. Note that recording amount data of the other colors is derived by performing processing similar to that for recording amount data of the cyan ink.

Details of FIG. 13 are described below. Two types of recording amount data of the cyan ink lower-level recording amount data U_c 1303 and the cyan ink higher-level recording amount data O_c 1304 are set as the recording amount data of the cyan ink. These two types of recording amount data U_c and O_c are calculated as shown in the following formulae by using the lower-level table U_C_LUT and the higher-level table O_C_LUT of the recording amount data setting table 1201:

$$U\_c(nx, ny)=C(nx, ny+\text{cut}(k))\times U\_C\_LUT(ny) \quad (19)$$

$$O\_c(nx, ny)=C(nx, ny+\text{cut}(k))\times O\_C\_LUT(ny) \quad (20),$$

where C(nx,ny+cut (k)) is a color separation value of the cyan ink C at XY coordinates (nx,ny+cut (k)) which is shown in formula (1).

Moreover, two types of recording amount data of the transparent ink lower-level recording amount data U_t 1307 and the transparent ink higher-level recording amount data O_t 1308 are set as the recording amount data of the transparent ink. These two types of transparent ink recording amount data U_t and O_t are calculated as shown in the following formula by using the lower-level table U_T_LUT and the higher-level table O_T_LUT of the recording amount data setting table;

$$U\_t(nx, ny)=T(nx, ny+\text{cut}(k))\times U\_T\_LUT(ny) \quad (21)$$

$$O\_t(nx, ny)=T(nx, ny+\text{cut}(k))\times O\_T\_LUT(ny) \quad (22),$$

where T(nx, ny+cut (k)) is a color separation value of the transparent ink T at XY coordinates (nx,ny+cut (k)) which is shown in formula (5).

Figure 14A:
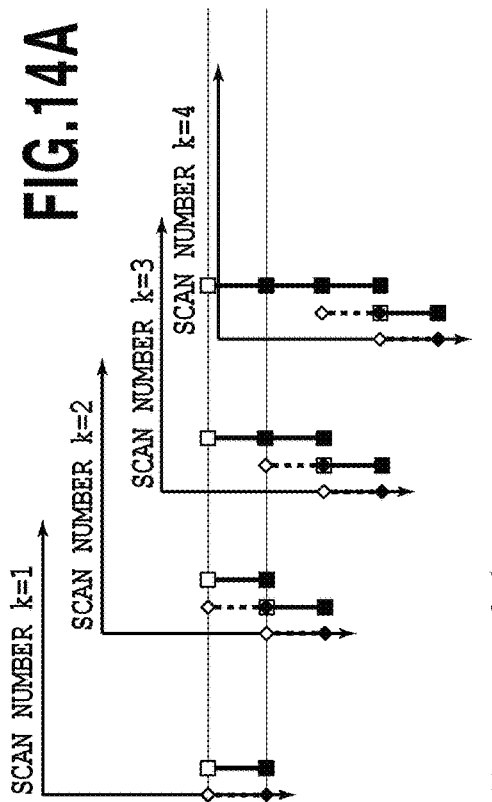
FIGS. 14A and 14B are diagrams illustrating a color separation data cut-out position cut (k) for each scan number.
Figure 14B:
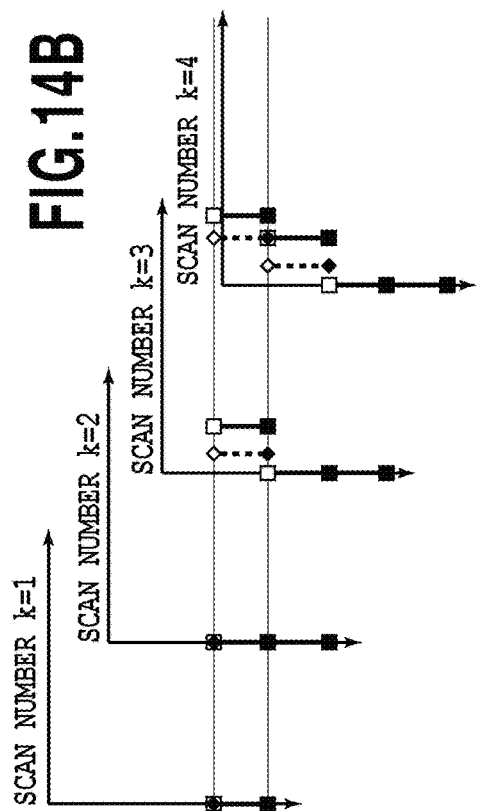

In the embodiment, in a case where the coordinates of the corresponding nozzle are outside a region of image Y address, the recording amount data is set to 0. For example, in a case of scan number k=1, 0 is substituted into both of the higher-level recording amount data and the lower-level recording amount data in nozzle rows in upper three quarters because the image Y address takes a negative value. Meanwhile, a significant value is substituted into the higher-level recording amount data and the lower-level recording amount data in the nozzle rows in a lower quarter. Since the color separation data cutting position cut (k) is determined by the scan number k, in a case of scan number k=1 to 4, the recording amount data is determined as illustrated in FIGS. 14A and 14B. FIGS. 14A and 14B show that an image is formed in a region A in four scan operations of the scan numbers k=1 to 4 by repeating the scan operations while sending a sheet.

FIGS. 14A and 14B illustrate the recording amount data (lower-level recording amount data U_c and higher-level recording amount data O_c) of the cyan ink for each nozzle position in each scan number and the recording amount data (lower-level recording amount data U_t and higher-level recording amount data O_t) of the transparent ink for each nozzle position in each scan number. The recording amount data of the cyan ink for each recording scan operation is determined from a product of the image data subjected to color separation and the recording amount data setting table 904 as in formulae (19) and (20). Moreover, the recording amount data of the transparent ink for each recording scan operation is determined from a product of the image data subjected to color separation and the recording amount data setting table 904 as in formulae (21) and (22). Although the example of the scan numbers 1 to 4 is given in the description of FIGS. 14A and 14B for the sake of convenience, in step S704, the processing is performed for each scan number. For example, the recording amount data of each nozzle corresponding to the scan number 1 is obtained in the first loop processing.

The setting of the recording amount and the recording order in each scan operation in step S704 of the embodiment is thus completed.

Next, let us return to FIG. 7 to continue the description of the flowchart. In subsequent step S705, the dot data generation unit 205 generates dot data based on the recording amount data set in step S704. Specifically, a control unit 951 in the dot data generation unit 205 generates the dot data by using the higher-level recording amount data and the lower-level recording amount data of each color.

The control unit 951 of the embodiment performs different types of processing for the ink T (transparent) with relatively high transmittance which is arranged in the upper layer and the ink C (cyan) with relatively low transmittance. Characteristics of the processing for the transparent ink (T) in the embodiments are such that the cycle of the thickness variation in the transparent ink is set to 40 μm or more and 320 μm or less and the nonuniformity of the thickness is increased with the inclination of the normal direction to the image surface kept small. This can reduce the coloring of the specular reflection due to the bronzing and thin-film interference phenomenon while improving the gloss uniformity, particularly the gloss clarity.

Specifically, dots of the transparent ink are set at such adjacent positions that multiple drops of the transparent ink formed in the same scan operation come into contact with one another, and the drops are thereby integrated with one another on the recording medium. A unit of this integration is set to 40 μm to 320 μm. The integration of the drops by contact is illustrated in part (a) of FIG. 15 (1501 to 1506). First, multiple dots are set at such adjacent positions that multiple drops formed in the same scan operation come into contact with one another, and ink liquid is ejected from the recording head 251 (1501). Next, the ink drops come into contact with one another on the recording medium and a large drop is formed (1502). Formation of ink drops in one scan operation is completed and the ink is solidified and fixed with elapse of time (1503). Since the amount of ink ejected for the integrated drops is great, the nonuniformity of the thickness increases. The time required for the fixation is about several hundred milliseconds at most. Accordingly, the integration occurs at positions where drops formed in the same scan operation come into contact with one another. In other words, in the subsequent scan operation, the integration of ink drops do not occur at positions where dots formed in the subsequent scan operation are adjacent to the dots formed in the previous scan operation (1504, 1505). Finally, integrated drops formed by contact between the drops are formed in multiple scan operations, and the cycle of the thickness variation is controlled to form a lens shape having a cycle of 40 μm to 320 μm (1506).

As a result, the nonuniformity (variation) of the thickness in the transparent ink is increased with the inclination of the normal direction to the image surface kept small. This reduces the coloring of the specular reflection while improving the gloss uniformity (particularly, the gloss clarity). Note that, as described above, it is known from the analysis by means of subjective evaluation (sensory evaluation) that the specular reflection appears white in a case where the difference between the thin portion and the thick portion in the nonuniformity of the thickness in the transparent ink is 180 nm (nanometers) or more. Accordingly, it is preferable to set the difference to 180 nm or more. However, depending on the composition of the ink drops and the like, the difference of 180 nm or more cannot be achieved in some cases. In such cases, it is desirable to increase the nonuniformity of the thickness as much as possible.

As described above, setting the cycle of the thickness variation in the transparent ink to a cycle of 40 μm to 320 μm reduces the inclination of the normal direction to the image surface (corresponding to reduction of roughness of the image surface) and improves the gloss uniformity (particularly, the gloss clarity). Furthermore, covering the color inks such as the cyan ink with the transparent ink reduces the bronzing caused by the color inks such as the cyan ink. Furthermore, making the thickness of the transparent ink uneven (making the difference 180 μm or more as much as possible) reduces the thin-film interference phenomenon.

Meanwhile, in a case where the cycle of the thickness variation in the color inks with low transmittance such as the cyan and black inks is increased, the decrease in graininess becomes easily visible. Accordingly, control like the control for the transparent ink is not performed.

The aforementioned control is performed in the generation of the dot data based on the recording amount data. Note that the recording amount data is data including the two types of data of the higher-level recording amount data and the lower-level recording amount data as described above.

The control unit 951 in the embodiment is described below. FIG. 9 illustrates a configuration of the control unit 951 which can be employed in the embodiment, and FIG. 16 illustrates a flowchart of processing performed by the control unit 951.

Figure 16:
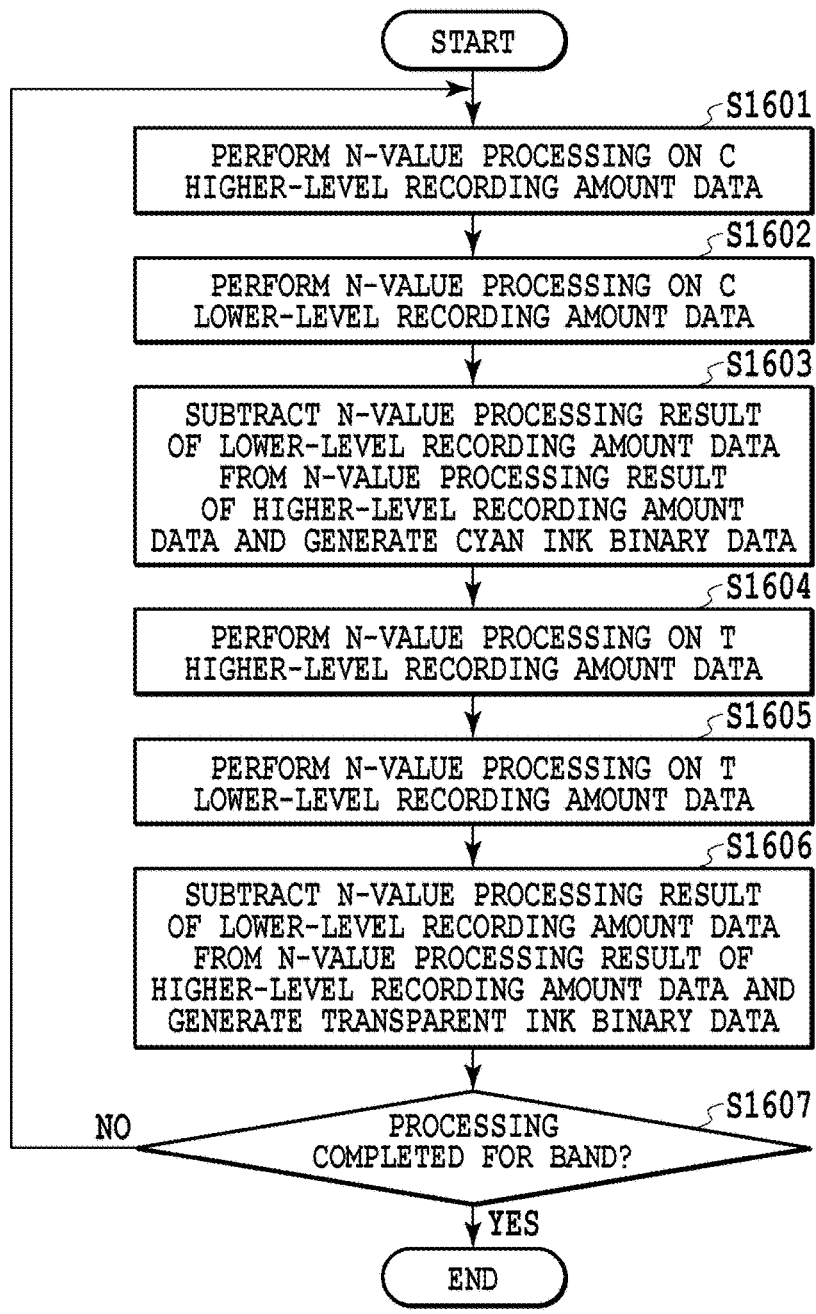
FIG. 16 is a flowchart showing processing performed by a control unit in Embodiment 1.

The flowchart of FIG. 16 is described below. In step S1601, the control unit 951 performs N-value processing on the cyan ink higher-level recording amount data O_c. An N-value processing unit 953 in the control unit 951 compares the higher-level recording amount data O_c of the cyan ink and a C threshold matrix Th_c 952. An example of the C threshold matrix Th_c 952 is illustrated in FIG. 17. The C threshold matrix Th_c is a threshold matrix used in the N-value processing unit 953 in the N-value processing of the cyan ink recording amount data. Thresholds in the C threshold matrix correspond to pixels in the cyan ink recording amount data, respectively. The N-value processing unit 953 compares a pixel value of each pixel indicating the higher-level recording amount data and the corresponding threshold in the C threshold matrix Th_c and sets the higher-level dot data.

$$\text{In a case of } O\_c < Th\_c, \text{ Out}\_O\_c = 0 \quad (23).$$

$$\text{In a case of } Th\_c \leq O\_c, \text{ Out}\_O\_c = 1 \quad (24).$$

An output value obtained as a result of this is the higher-level dot data Out_O_c of the cyan ink. Note that, in the aforementioned example, the C threshold matrix Th_c 952 is a matrix having one threshold for each pixel. In the case where there is one threshold for each pixel, binarization of 0 and 1 is possible. However, N−1 thresholds may be used for each pixel as a matter of course. In this case, N-value processing is made possible.

Next, in step S1602, the control unit 951 performs the N-value processing on the cyan ink lower-level recording amount data U_c. An N-value processing unit 954 in the control unit 951 compares the lower-level recording amount data U_c of the cyan ink and the C threshold matrix Th_c 952.

In a case of U_c<Th_c, Out_U_c=0 (25).

In a case of Th_c≤U_c, Out_U_c=1 (26).

An output value obtained as a result of this is the lower-level dot data Out_U_c of the cyan ink.

The C threshold matrix 952 of the cyan ink with relatively low transmittance preferably has blue noise characteristics in which dot arrangement tends to be distributed from a view point of graininess. Moreover, regarding the C threshold matrix 952, the same threshold matrix is used for all of the colors and all of the scan numbers in the embodiment. However, different threshold matrices may be used.

Next, in step S1603, a subtractor 955 generates cyan ink binary data by subtracting the cyan ink lower-level dot data from the cyan ink higher-level dot data.

Out_c=Out_O_c−Out_U_c (27)

The cyan ink dot data Out_c calculated by the aforementioned processing is cyan ink dot data for one scan operation.

Note that, in the aforementioned formula (27), the cyan ink binary data Out_c is generated from a difference between the N-value processing result Out_O_c of the cyan ink higher-level recording amount data O_c and the N-value processing result Out_U_c of the lower-level recording amount data U_c. However, the method of generating Out_c is not limited to this calculation.

For example, the method may be as follows. In a case where the higher-level recording amount data O_c is equal to or more than the threshold matrix Th_c and the lower-level recording amount data U_c is smaller than the threshold matrix Th_c, Out_c is set to 1. Meanwhile, in the other cases, Out_c is set to 0. In other words, similar effects can obtained by setting Out_c to 1 in the condition of U_c<Th_c≤O_c and by setting Out_c to 0 in the other conditions.

In step S1604, the control unit 951 performs the N-value processing on the transparent ink higher-level recording amount data O_t. An N-value processing unit 957 in the control unit 951 compares the higher-level recording amount data O_t of the transparent ink and a T threshold matrix Th_t 956. The T threshold matrix Th_t 956 is illustrated in FIG. 17. The T threshold matrix Th_t is a threshold matrix used in the N-value processing unit 957 in the N-value processing of the transparent ink. Thresholds in the T threshold matrix correspond to pixels in the transparent ink recording amount data, respectively. The N-value processing unit 957 compares a pixel value of each pixel indicating the higher-level recording amount data and the corresponding threshold in the T threshold matrix Th_t and sets the higher-level dot data.

In a case of O_t<Th_t, Out_O_t=0 (28).

In a case of Th_t≤O_t, Out_O_t=1 (29).

An output value obtained as a result of this is the higher-level dot data Out_O_t of the transparent ink. Note that, in the aforementioned example, the T threshold matrix Th_t 956 may use N−1 thresholds for each pixel as in the case of cyan. In this case, N-value processing is made possible.

Next, in step S1605, the N-value processing of the transparent ink lower-level recording amount data U_t is performed. An N-value processing unit 958 in the control unit 951 compares the lower-level recording amount data U_t of the transparent ink and the T threshold matrix Th_t 956.

In a case of U_t<Th_t, Out_U_t=0 (30).

In a case of Th_t≤U_t, Out_U_t=1 (31).

An output value obtained as a result of this is the lower-level dot data Out_U_t of the transparent ink. Note that, in the aforementioned example, the dot data of the cyan ink is generated and then the dot data of the transparent ink is generated. However, the order of generating the data is not limited to this. Moreover, the processing for generating the aforementioned two pieces of dot data may be performed in parallel.

In a case where at least part of the transparent ink is disposed in the upper layer as described above, the nonuniformity of the thickness is increased with the cycle of the thickness variation set to 40 μm or more and 320 μm or less. In the embodiment, multiple dots of the transparent ink are set at such adjacent positions that multiple drops formed in the same scan operation come into contact with one another, and the drops are thereby integrated on the recording medium. The unit of this integration is set to 40 μm to 320 μm.

In a case where the resolution in the embodiment is 1200 dpi, the size of one pixel is about 20 μm square. Accordingly, in the embodiment, dots at such adjacent positions that multiple drops come into contact with one another is set in a region of 2×2 pixels or more and 16×16 pixels or less in a scan region.

In order to perform the aforementioned control, the T threshold matrix 956 preferably has such arrangement characteristics that dots are arranged to be concentrated in a region of 2×2 pixels or more and 16×16 pixels or less in the scanning region. Regarding the T threshold matrix 956, the same threshold matrix is used for all of the scan numbers in the embodiment. However, different threshold matrices which satisfy the condition that the cycle of the thickness variation is set to 40 μm or more and 320 μm or less may be used.

Next, in steps 1606, a subtractor 959 generates transparent ink binary data by subtracting the transparent ink lower-level dot data from the transparent ink higher-level dot data.

Out_t=Out_O_t−Out_U_t (32).

The transparent ink dot data Out_t calculated by the aforementioned processing is transparent ink dot data for one scan operation.

Note that, in the aforementioned formula (32), the transparent ink binary data Out_t is generated from a difference between the N-value processing result Out_O_t of the transparent ink higher-level recording amount data O_t and the N-value processing result Out_U_t of the lower-level recording amount data U_t. However, the method of generating Out_t is not limited to this calculation.

For example, the method may be as follows. In a case where the higher-level recording amount data O_t is equal to or more than the threshold matrix Th_t and the lower-level recording amount data U_t is smaller than the threshold matrix Th_t, Out_t is set to 1. Meanwhile, in the other cases, Out_t is set to 0. In other words, similar effects can obtained by setting Out_t to 1 in the condition of U_t<Th_t≤O_t and by setting Out_t to 0 in the other conditions.

In step S1607, the control unit 951 determines whether the aforementioned processing of steps S1601 to S1606 is performed for addresses (0, 0) to (W−1, Nzzl−1) in a band. In a case where there is an unprocessed region, the processing returns to step S1601 and is repeated. The dot arrangements of the cyan ink dot data Out_c and the transparent ink dot data Out_t are determined by performing such processing. Note that W is the image size of the input image. Regarding the other colors, magenta ink dot data Out m, yellow ink dot data Out_y, and black ink dot data Out k is generated in similar processing as that for the cyan ink dot data, and the dot data to be formed in each recording scan operation is thereby determined. The dot control processing in step S705 shown in FIG. 7 is completed by the aforementioned processing.

The dot control processing in the scan number k=1 is thus completed. As a result, pieces of dot data of the respective colors to be formed in one head operation are stored in regions of the storage buffer 206 for the respective colors.

Next, in step S706, the image processing apparatus 200 outputs dot data of a band-shaped region stored in the storage buffer 206, from the image output terminal 207 to the image formation apparatus 250, the size of the band-shaped region in the vertical direction being equal to the number of nozzles (Nzzl), the size of the band-shaped region in the horizontal direction being equal to an X size (W) of the image.

Figure 18:
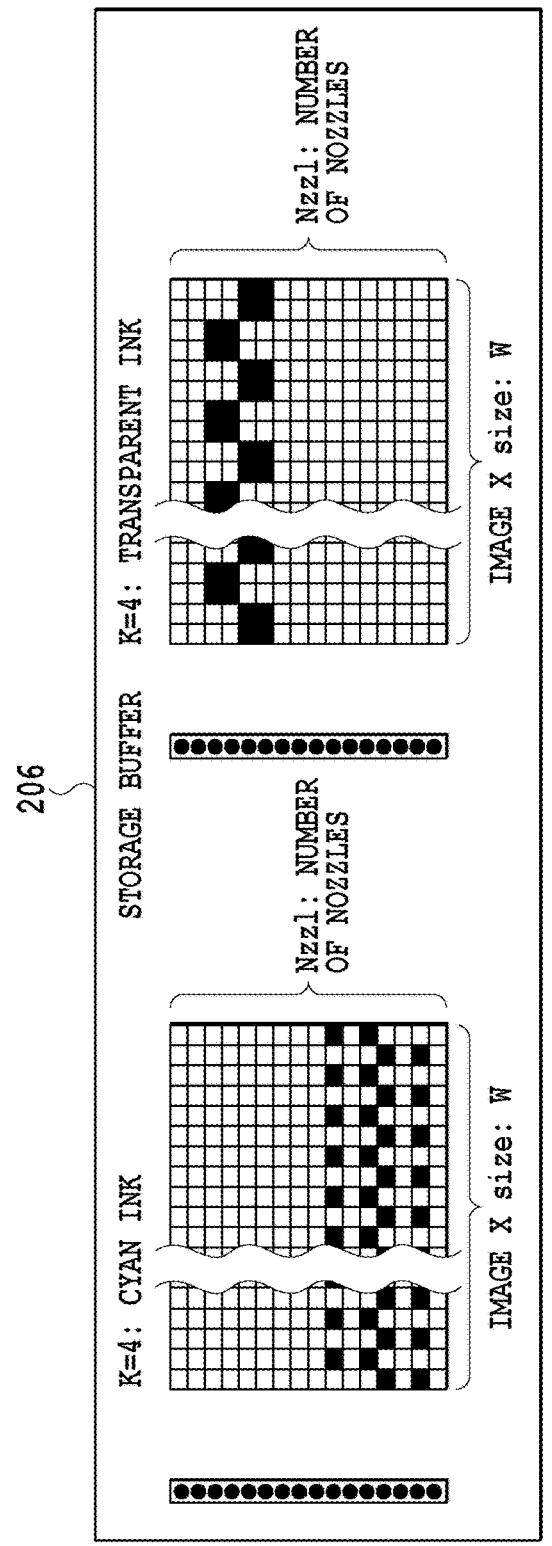
FIG. 18 is a diagram for explaining data stored in a storage buffer.

Pieces of dot data of the cyan ink and the transparent ink in the scan number k=4 which are stored in the storage buffer 206 are illustrated in FIG. 18. In FIG. 18, black dots are pixels in which dots are formed and white dots are pixels in which no dots are formed. From this, it can been seen that dots of the transparent ink are formed by the nozzles above the nozzles forming dots of the cyan ink. The dots are formed in such a way so as to form at least part of the transparent ink in the layer above the cyan ink as illustrated in FIGS. 14A and 14B.

In step S751, the image formation apparatus 250 obtains the dot data transferred from the image processing apparatus 200. Next, in step S752, the image formation apparatus 250 starts a printing operation based on the dot data obtained in step S751. Specifically, the ink color selection unit 256 of the image formation apparatus 250 selects an ink color suiting the dot data obtained in step S751 and the printing operation is started. In step S752, a main scan operation is performed once in which an image is recorded on the recording medium by driving the nozzles at fixed drive intervals while moving the recording head 251 from left to right relative to the recording medium. After the completion of the main scan operation, a sub-scan operation which is scanning in a direction perpendicular to the direction of the main scan operation is performed once. In step S753, the image formation apparatus 250 repeats the processing of steps S751 and S752 until the printing processing is completed for all pieces of data.

Next, let us return to the description of the processing by the image processing apparatus 200. In step S707, the image processing apparatus 200 determines whether all scan operations are completed. In a case where all scan operations are completed, the image formation processing is terminated. Meanwhile, in a case where not all of the scan operations are completed, the image processing apparatus 200 returns to step S703, increments the scan number k of the processing target, and repeats the processing from step S703. The entire processing is thus completed.

Examples of data of the cyan ink and the transparent ink in the middle of the calculation by the dot data generation unit 205 and results of this calculation which are described above are illustrated in FIGS. 19 and 20.

Figure 19:
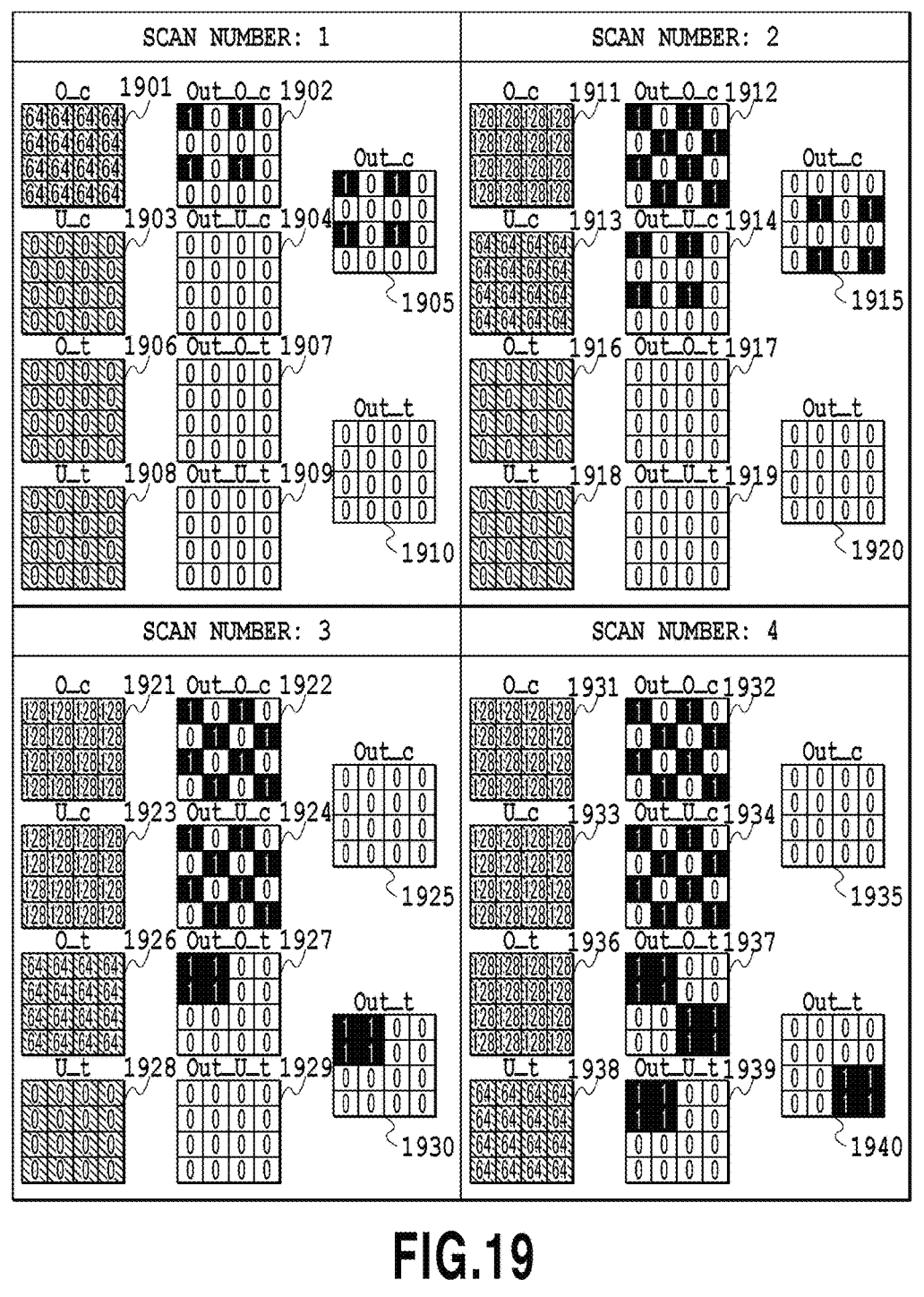

In FIG. 19, cyan ink higher-level dot data Out_O_c 1902 is obtained based on cyan ink higher-level recording amount data O_c 1901 of the scan number 1. Moreover, cyan ink lower-level dot data Out_U_c 1904 is obtained based on cyan ink lower-level recording amount data U_c 1903 of the scan number 1. As a result, cyan ink dot data Out_c 1905 is obtained by using formula (27).

Meanwhile, transparent ink higher-level dot data Out_O_t 1907 is obtained based on transparent ink higher-level recording amount data O_t 1906 of the scan number 1. Moreover, transparent ink lower-level dot data Out_U_c 1909 is obtained based on transparent ink lower-level recording amount data U_t 1908 of the scan number 1. As a result, transparent ink dot data Out_t 1910 is obtained by using formula (32).

In addition, cyan ink higher-level dot data Out_O_c 1912 is obtained based on cyan ink higher-level recording amount data O_c 1911 of the scan number 2. Moreover, cyan ink lower-level dot data Out_U_c 1914 is obtained based on cyan ink lower-level recording amount data U_c 1913 of the scan number 2. As a result, cyan ink dot data Out_t 1915 is obtained by using formula (27).

Furthermore, transparent ink higher-level dot data Out_O_t 1917 is obtained based on transparent ink higher-level recording amount data O_t 1916 of the scan number 2. Moreover, transparent ink lower-level dot data Out_U_c 1919 is obtained based on transparent ink lower-level recording amount data U_t 1918 of the scan number 2. As a result, transparent ink dot data Out_t 1920 is obtained by using formula (32). The dot data of the scan numbers 3 and 4 are obtained thereafter in similar way.

Here, pay attention to the point that, for example, the cyan ink higher-level recording mount data O_c 1901 of the scan number 1 is the same data as the cyan ink lower-level recording amount data U_c 1913 of the scan number 2. For the cyan ink, in the scan number 2, the cyan ink dot data Out_c 1915 is obtained by subtracting the cyan ink lower-level dot data Out_U_c 1914 from the cyan ink higher-level dot data Out_O_c 1912. This means that the dots of the scan number 2 are controlled not to be formed at the same positions as the dots of the scan number 1. Similarly, for the transparent ink, the dots of the scan number 4 are controlled not to be formed at the same positions as the dots of the scan number 3.

Figure 20:
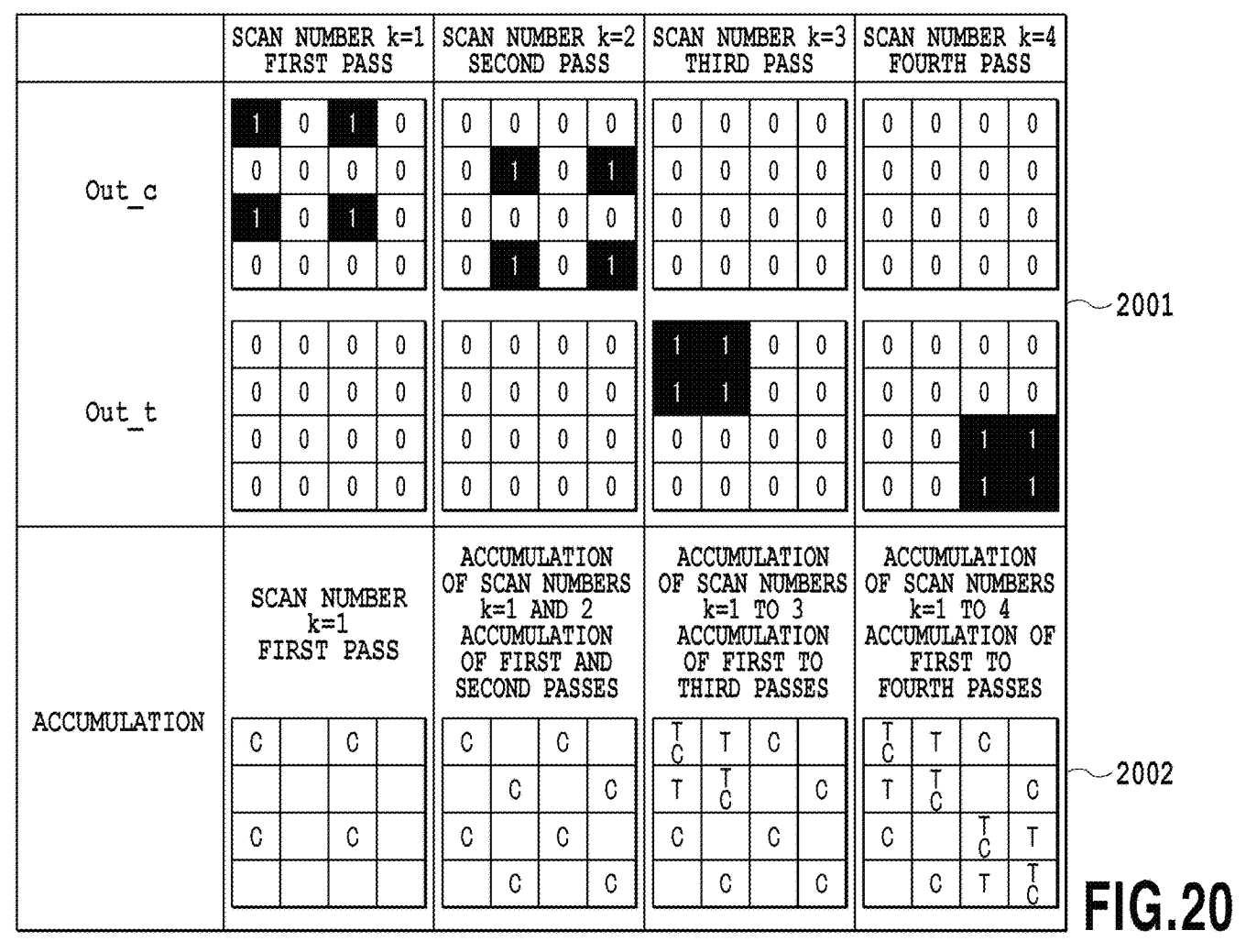

By repeating such processing, dots are obtained as illustrated in FIG. 20 in each scan operation and at the end. Each piece of dot data 2001 of FIG. 20 includes pieces of dot data of the cyan ink and the transparent ink obtained for the corresponding scan number. Each piece of accumulated dot data 2002 of FIG. 20 is accumulated dot data of dots of the cyan ink (C) and the transparent ink (T) which are formed in the corresponding scan number and the scan numbers therebefore. Moreover, cells in which letter T is written above letter C in the accumulated dot data 2002 indicate that the transparent ink overlaps the cyan ink and the transparent ink (T) is provided in the upper layer while the cyan ink (C) is provided in the lower layer.

It can be understood from this accumulated dot data that, in regions where there is overlapping of the dot data of the cyan ink and the dot data of the transparent ink, the transparent ink is provided in the upper layer and the cyan ink is provided in the lower layer.

In the aforementioned example, all transparent ink is fixed in the layer above the cyan ink. However, not all of the transparent ink needs to be fixed in the layer above the cyan ink, and only part of the transparent ink may be fixed in the layer above the cyan ink.

In a case where at least part of the transparent ink is disposed in the upper layer as described above, the nonuniformity of the thickness is increased with the cycle of the thickness variation set to 40 µm or more and 320 µm or less. In order to achieve this, in the embodiment, multiple dots of the transparent ink are set at such adjacent positions that drops formed in the same scan operation come into contact with one another, and the drops are thereby integrated on the recording medium. A unit of this integration is set to 40 µm to 320 µm.

As described above, in the embodiment, multiple dots of the transparent ink are set at such adjacent positions that multiple drops of the transparent ink formed in the same scan operation come into contact with one another, and the drops are thereby integrated on the recording medium. At this time, the drops of the transparent ink are integrated with the cycle set to 40 µm or more and 320 µm or less The nonuniformity (variation) of the thickness in the ink with high transmittance (transparent ink) is thereby increased with the inclination of the normal direction to the image surface kept small. This reduces the coloring of the specular reflection while improving the gloss uniformity (particularly, the gloss clarity).

In the aforementioned example, the transparent ink is applied after the color ink by performing dithering processing in each scan operation. In this case, the dots of the transparent ink are arranged at such adjacent positions that multiple drops formed in the same scan operation come into contact with one another.

However, control equivalent to that described above can be achieved by performing error diffusion processing in each scan operation. In this case, in order to arrange dots at such adjacent positions that multiple drops formed in the same scan operation come into contact with one another, output feedback error diffusion method which is dot concentrating control of an error diffusion method may be used. An example of the output feedback error diffusion method is described in Daniel L. Lau, Gonzalo R. Arce, "Modern Digital Halftoning (Signal Processing and Communications)".

Figure 21:
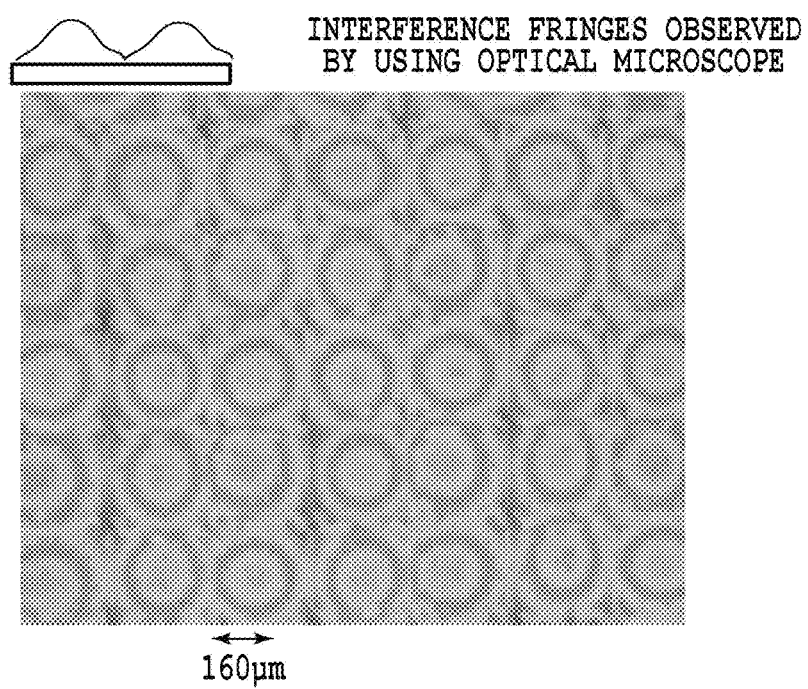
FIG. 21 is a view illustrating an optical microscope image obtained to verify the cycle of the thickness variation in the applied transparent ink.

Note that the maximum variation cycle of the thickness variation in the transparent ink in the embodiment can be easily verified by using an optical microscope. FIG. 21 illustrates an example in which distribution of the transparent ink applied onto a sheet is observed by an optical microscope with epi-illumination. It is found from FIG. 21 that circular interference fringes are observed. An interval of the circular interference fringes is the maximum variation cycle of the thickness variation in the transparent ink. FIG. 21 is an example in which multiple dots of the transparent ink are set at such adjacent positions that drops formed in the same scan operation come into contact with one another, the dots set in such a way that the cycle of the thickness variation in the transparent ink is 160 µm (in a case of 1200 dpi, size of 8×8 pixels in a scan region). As described above, whether or not the cycle of the thickness variation in the transparent ink is 40 µm or more and 320 µm or less can be verified through measurement of an actually-formed sample.

In the aforementioned embodiment, an example is given in which the cycle of the thickness variation in the transparent ink is set within the range of 40 µm to 320 µm in all regions of the image surface to increase the nonuniformity of the thickness in the transparent ink. However, the cycle of the thickness variation cannot be sometimes set within the range of 40 µm to 320 µm in all regions due to dot arrangement.

In such cases, the cycle of the thickness variation in the transparent ink may be set within the range of 40 µm to 320 µm only in some of the regions. Specifically, it is possible to set the cycle of the thickness variation within the range of 40 µm to 320 µm in some of the regions and set the cycle of the thickness variation to 20 µm in the other regions.

An effect of increasing the nonuniformity (variation) of the thickness in the ink with high transmittance (transparent ink) with the inclination of the normal direction to the image surface kept small can be sufficiently obtained by setting the cycle of the thickness variation in the transparent ink within the range of 40 µm to 320 µm only in some of the regions as described above. This reduces the coloring of the specular reflection while improving the gloss uniformity (particularly, the gloss clarity).

Moreover, setting the cycle of the thickness variation in the transparent ink within the range of 40 µm to 320 µm in some of the regions includes the following situations.

For example, there is a case where ink dots formed by fixing ink drops onto the sheet are not integrated into one and formed as two or more separate ink dots. Such a case occurs because a drop is divided into multiple droplets in the process of ink ejection and the divided droplets are applied onto the sheet. Among the ink dots formed by two or more divided droplets, a dot which is smaller than a dot of a main drop which should land on the sheet is referred to as satellite dot. The satellite dot is sometimes formed at a position far away from the dot of the main drop (in some cases, 100 micrometers away or more). In the case where the dot of the main drop and the satellite dot are formed far away from each other, it is likely that ink drops do not come into contact and integrate with each other. However, even if the dot of the main drop and the satellite dot do not come into contact and integrate with each other, since the satellite dot is smaller than the dot the main drop, the effect on the inclination of the normal direction to the image surface is small.

Specifically, even if the satellite dot is not integrated, such a situation is included in the situation where the cycle of the thickness variation in the transparent ink is set within the range of 40 µm to 320 µm in some of the regions, as long as the cycle of the thickness variation of the dots the main drops is within the range of 40 µm to 320 µm.

Moreover, in the aforementioned embodiment, an example is given in which the same cycle of the thickness variation within the range of 40 µm to 320 µm is set in all regions. However, the cycle of the thickness variation may vary among the regions. For example, the cycle of the thickness variation may be 40 µm in one region and be 80 µm in a region adjacent thereto.

Furthermore, in the aforementioned embodiment, an example is given in which the cycle of the thickness variation is a pattern of squares whose length of one side is 40 µm to 320 µm. However, the cycle of the thickness variation does not have to be a pattern of squares. For example, the cycle of the thickness variation may be a pattern of rectangles of 40 µm vertical and 80 µm horizontal in one region and be a pattern of rectangles of 100 µm vertical and 40 µm horizontal in another region. Moreover, the cycle of the thickness variation may be a pattern of non-rectangular shapes such as circles or ellipses.

<Modified Examples>

In the aforementioned example, application of the transparent ink in the upper layer and dot concentrating control are made possible by using dithering processing in each scan operation and dot data control of controlling the dot data such that the transparent ink is applied after the color ink.

However, as the method of controlling the dot data for each scan operation such that dots of the transparent ink is formed after the dots of the color ink, it is possible to use publicly-known mask separation processing (so-called pass mask). Dot data control using the mask separation is described by using a block diagram of FIG. 22. Note that this modified example corresponds to the dot data control processing in the dot data generation unit 205 of FIG. 1, and the flowchart of FIG. 7 is used as in Embodiment 1. Moreover, since processing of the modified example is the same as that in Embodiment 1 except for steps S704 to S705 in FIG. 7, description thereof is omitted.

Figure 23:
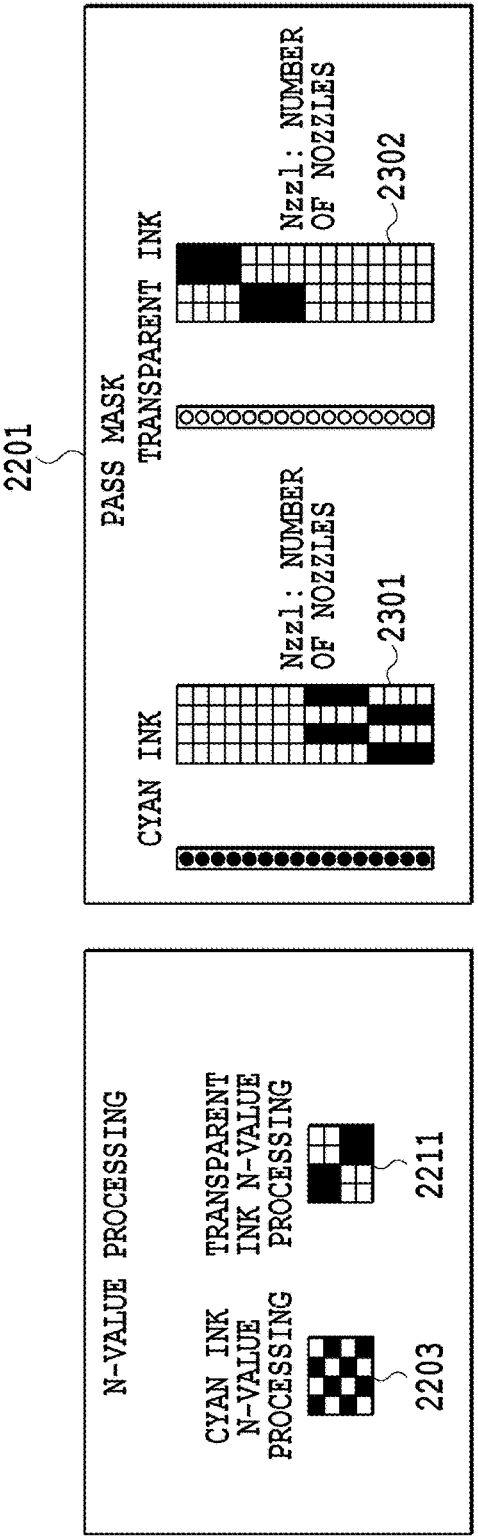
FIGS. 23A and 23B are diagrams illustrating N-value data and a pass mask in the modified example of Embodiment 1.

First, in step S704, the setting unit 901 sets a mask pattern which indicates the recording order and the recording amount for each nozzle in each scan operation by using a pass mask 2201. FIGS. 23A and 23B illustrate a pass mask PsMsk_c 2301 of the cyan ink and a pass mask PsMsk_t 2302 of the transparent ink. White pixels in the pass masks mean non-recording and pixel values thereof are 0. Black pixels in the pass masks mean recording and pixel values thereof are 1.

For example, in the pass mask 2301 of the cyan ink, an image is formed by using only the nozzles in the lower half portion and by sending the sheet by an amount equal to a quarter of the length of the set of nozzles. Moreover, in the pass mask 2302 of the transparent ink, an image is formed by using only the nozzles in the upper half portion and by sending the sheet by an amount equal to a quarter of the length of set of nozzles.

In the example of FIGS. 23A and 23B, the number of used nozzles is half the number of all nozzles in both of the pass masks of the cyan ink and the transparent ink. Accordingly, the image is formed substantially in two-pass printing. In the example of the pass mask of the cyan ink, the image is exclusively formed in recording of the first two scan operations out of the four scan operations. Meanwhile, in the example of the pass mask of the transparent ink, the image is formed in the last two scan operations out of the four scan operations. Hence, the cyan ink is applied first on the recording medium and then the transparent ink is applied in the layer above the cyan ink. Note that, although not illustrated, like the cyan ink, the other color inks of magenta, yellow and black are applied on the recording medium before the transparent ink, by using only the nozzle in the lower half portion.

Setting of the recording amount and the recording order in each scan operation in step S704 of the modified example is thus completed.

Next, in step S705, the control unit 951 in the dot data generation unit 205 performs the N-value processing on pieces of color separation data of the respective color, and generates the dot data for each scan operation by using the aforementioned pass masks.

The control unit 951 of the modified example also performs different types of processing for the ink T (transparent) with relatively high transmittance which is arranged in the upper layer and the ink C (cyan) with relatively low transmittance. Characteristics of the processing performed on the transparent ink (T) in the modified example are such that the cycle of the thickness variation is set to 40 μm or more and 320 μm or less and the nonuniformity of the thickness is increased with the inclination of the normal direction to the image surface kept small, and are the same as those in the aforementioned embodiment. This reduces the coloring of the specular reflection due to the bronzing and the thin-film interference phenomenon while improving the gloss uniformity, particularly the gloss clarity.

Figure 22:
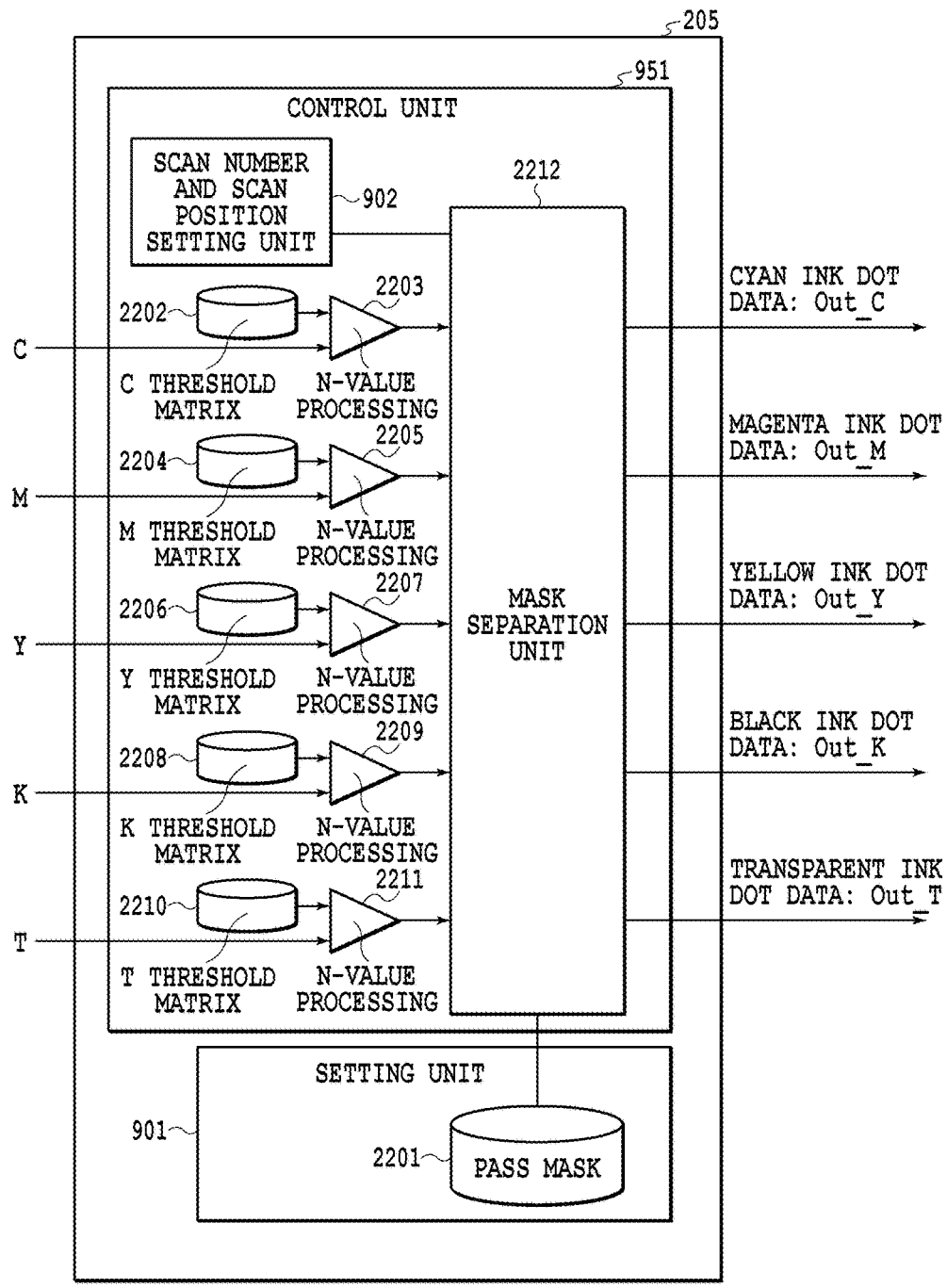
FIG. 22 is a diagram illustrating a configuration of the dot data generation unit in a modified example of Embodiment 1.
Figure 24:
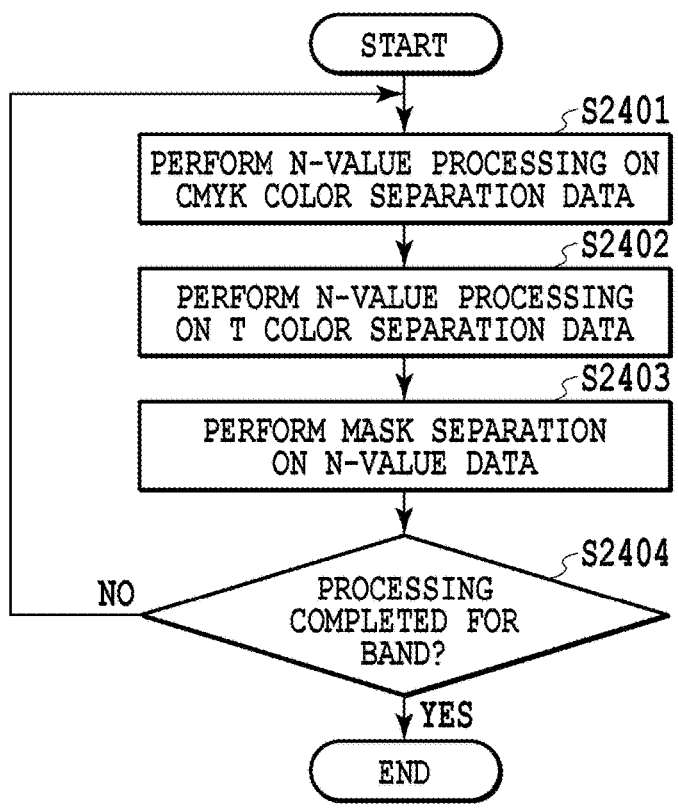
FIG. 24 is a flowchart showing processing performed by the control unit in the modified example of Embodiment 1.

The control unit 951 in the modified example is described below. FIG. 22 illustrates a configuration of the control unit 951 which can be employed in the modified example, and FIG. 24 illustrates a flowchart of the processing performed by the control unit 951.

In step S2401, the control unit 951 performs N-value processing on CMYK which are color separation values calculated by using formulae (1) to (4). In the N-value processing of the cyan ink, an N-value processing unit 2203 in the control unit 951 performs the N-value processing by using a C threshold matrix Th_c 2202. The C threshold matrix Th_c 2202 is assumed to be the same as the C threshold matrix Th_c in FIG. 17. Thresholds in the C threshold matrix Th_c 2202 correspond to pixels in the cyan color separation data C (formula (1)), respectively. The N-value processing unit 2203 compares a pixel value of each pixel indicating the cyan color separation data and the corresponding threshold in the C threshold matrix Th_c and calculates N-value data.

$$\text{In a case of } C<Th\_c, N\_Out\_c=0 \qquad (33).$$

$$\text{In a case of } Th\_c \leq C, N\_Out\_c=1 \qquad (34).$$

An output value obtained as a result of this is the N-value data N_Out_c of the cyan ink. Note that, in the aforementioned example, binarization of 0 and 1 is performed. However, N-value processing can be performed by using N−1 thresholds for each pixel in the C threshold matrix Th_c. Although only the N-value processing of the cyan ink is described in the aforementioned example, the N-value processing is also performed for the other inks of MYK.

Next, in step S2402, the control unit 951 performs the N-value processing on T (transparent ink) which is a color separation value calculated by using formula (5). In the N-value processing of the transparent ink, an N-value processing unit 2211 in the control unit 951 performs the N-value processing by using a T threshold matrix Th_t 2210. The T threshold matrix Th_t 2210 is assumed to be the same as the T threshold matrix Th_t in FIG. 17. Thresholds in the T threshold matrix Th_t 2210 correspond to pixels in the transparent ink color separation data T(formula (5)), respectively. The N-value processing unit 2211 compares the pixel value of each pixel indicating the transparent ink color separation data and the corresponding threshold value in the T threshold matrix Th_t and calculates N-value data.

$$\text{In a case of } T<Th\_t, N\_Out\_t=0 \qquad (35).$$

$$\text{In a case of } Th\_t \leq T, N\_Out\_t=1 \qquad (36).$$

An output value obtained as a result of this is the N-value data N_Out_t of the transparent ink. N-value processing can be performed also for the transparent ink by using N−1 thresholds for each pixel in the T threshold matrix Th_t.

Next, in step S2403, the mask separation unit 2212 performs mask separation on the N-value data by using the pass mask 2201 and generates dot data for each scan operation.

The pass mask PsMsk_c 2301 of the cyan ink is expressed in binary of 0 and 1, and the pass mask PsMsk_t 2302 of the transparent ink is also expressed in binary of 0 and 1. In this case, the pass separation is expressed by the following logical conjunctions.

$$Out\_c = N\_Out\_c(nx, ny+cut(k)) \cap PsMsk\_c(nx \% Msk\_x, ny) \qquad (37)$$

$$\text{Out\_}t = N\_\text{Out\_}t(nx,\ ny+\text{cut}(k)) \cap PsMsk\_t(nx\ \%\ Msk\_x,\ ny) \quad (38)$$

(∩ means logical conjunction)

Note that cut (k) in the XY coordinates (nx, ny+cut (k)) of formulae (37) and (38) is a scan position in a scan number k which is indicated in formula (6). Moreover, ny satisfies 0≤ny<Nzzl (the number of nozzles), and nx is an X coordinate of the original input image.

Moreover, Msk_x is the horizontal size of the pass mask, and nx % Msk_x means a remainder between an X coordinate of the original N-value image and Msk_x. This means that the pass mass is repeatedly used in the horizontal direction.

In this description, Out_c is the dot data of the cyan ink in one scan operation and Out_t is the dot data of the transparent ink in one scan operation. N_Out_c takes one of the values of 0 and 1, and PsMsk_c takes one of the values of 0 and 1. In this case, Out_c is calculated by using the logical conjunction ∩ to take one of the values of 0 and 1. Rules in this case are as follows.

N_Out_c: 0, PsMsk_c: 0→Out_c: 0

N_Out_c: 0, PsMsk_c: 1→Out_c: 0

N_Out_c: 1, PsMsk_c: 0→Out_c: 0

N_Out_c: 1, PsMsk_c: 1→Out_c: 1 (39).

The dot data Out_t of the transparent ink is calculated by using the logical conjunction ∩ under similar rules.

In a case where the resolution in the modified example is 1200 dpi, the size of one pixel is about 20 µm square. In this case, in order to set the cycle of the thickness variation in the transparent ink to 40 µm or more and 320 µm or less, a pass mask is required which sets multiple dots at such adjacent positions that drops formed in the same scan operation come into contact with one another, thereby causing the drops to be integrated. A unit of this integration by the pass mask needs to be set to 40 µm to 320 µm.

In view of this, in the modified example, as illustrated in FIGS. 23A and 23B, the pass mask PsMsk_t 2303 is set such that drops formed in the same scan operation are arranged in units of 2×2 pixels or more (40 µm or more) and 16×16 pixels or less (320 µm or less).

Next, in step S2404, the aforementioned processing of steps S2401 to S2403 is performed for addresses (0, 0) to (W−1, Nzzl−1) in a band. The dot data Out_c of the cyan ink and the dot data Out_t of the transparent ink is thereby determined. Note that W is the image size of the input image. Regarding the other colors, magenta ink dot data Out m, yellow ink dot data Out_y, and black ink dot data Out k is generated in similar processing as that for the cyan ink dot data, and the dot data to be formed in each recording scan operation is thereby determined. The dot control processing in step S705 is thus completed.

The dot control processing in the scan number k=1 is thus completed. As a result, pieces of dot data of the respective colors to be formed in one head operation are stored in regions of the storage buffer 206 for the respective colors. Thereafter, steps similar to steps S706 to S708 in Embodiment 1 are performed and the image formation is thus completed.

In the modified example, pieces of dot data of the cyan ink and the transparent ink in the scan number k=4 which are stored in the storage buffer 206 are pieces of dot data illustrated in FIG. 18 as in Embodiment 1.

Moreover, pieces of dot data of the cyan ink and the transparent ink in the middle of the processing by the dot data generation unit 205 are pieces of dot data illustrated in FIG. 20 as in Embodiment 1.

Figure 25:
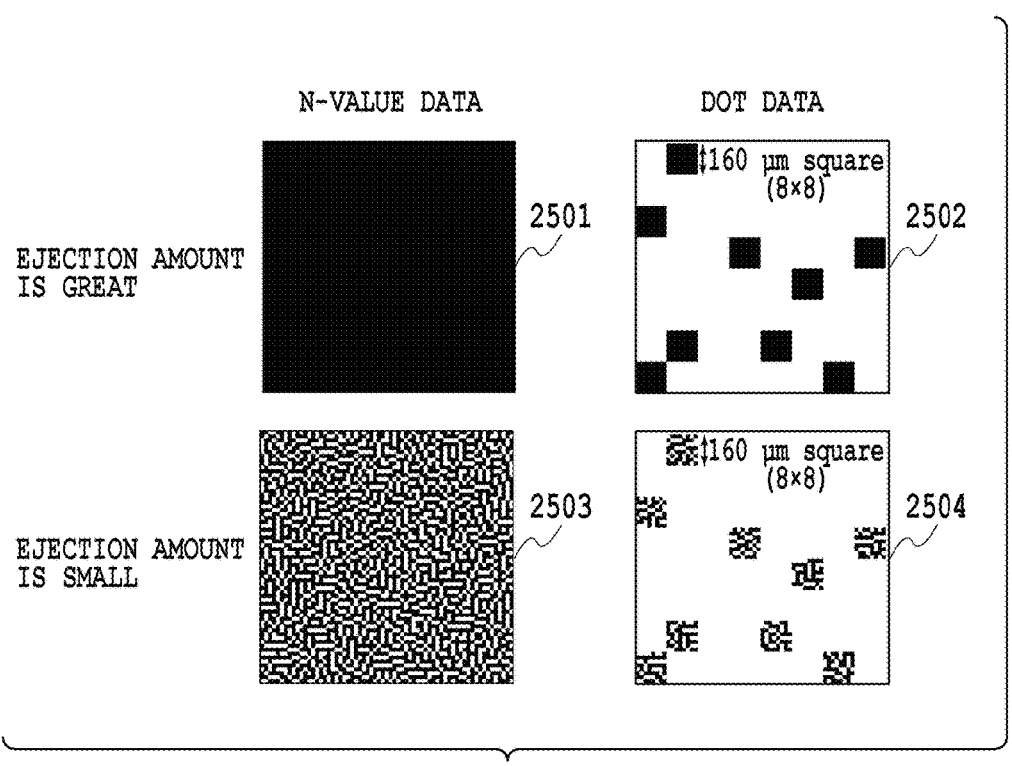
FIG. 25 is a diagram illustrating pieces of dot data of the transparent ink which vary in an ejection amount.

Furthermore, in the modified example, even if the ejection amount of the transparent ink changes by some degree, the integration of drops of the transparent ink can be achieved by using the pass mask by which drops formed in the same scan operation are arranged in units of 2×2 pixels or more and 16×16 pixels or less. For example, as illustrated in FIG. 25, dot data 2502 is generated for N-value data 2501 whose ejection amount of the transparent ink after the N-value processing is great, by using a pass mask set such that drops in a region of 8×8 pixels come into contact with one another. Meanwhile, dot data 2504 is generated for N-value data 2503 whose ejection amount of the transparent ink after the N-value processing is small, by using the pass mask set such that drops in a region of 8×8 pixels come into contact with one another. In the dot data 2502 whose ejection amount after the N-value processing great, the ink drops in the 8×8 unit region come into contact with one another. Moreover, also in the dot data 2504 whose ejection amount after the N-value processing is small, the ink drops in the 8×8 unit region come into contact with one another. This is because the dot size of the transparent ink on the recording medium in an inkjet method is greater (30 µm or more) than 20 µm which is the size of one pixel in the resolution of 1200 dpi. There is no need to form dots at all of the adjacent pixel positions. For example, even in scan operation dot data such as the dot data 2504 in which white pixels are inserted, the integration phenomenon occurs on the recording medium because the dot size is great. Amplitude of the thickness variation in the transparent ink in the dot data 2504 is slightly smaller than that in the dot data 2502. However, the cycle of the thickness variation is 160 µm in both of the dot data 2502 and the dot data 2504.

As described above, in the modified example, the pass mask is used by which multiple dots of the transparent ink are set at such adjacent positions that drops of the transparent ink formed in the same scan operation come into contact with one another and the drops are thereby integrated.

In this case, the drops of the transparent ink are integrated in units of 40 µm to 320 µm so that the cycle of the thickness variation can be set to 40 µm or more and 320 µm or less.

Specifically, in a case where the resolution is 1200 dpi, the size of one pixel is about 20 µm square. Accordingly, dot setting which causes dots to be set at such adjacent positions that multiple drops of the transparent ink formed in the same scan operation come into contact with one another is a pass mask by which the drops formed in the same scan operation are arranged in units of 2×2 pixels or more and 16×16 pixels or less.

The nonuniformity (variation) of the thickness in the ink with high transmittance (transparent ink) is thereby increased with the inclination of the normal direction to the image surface kept small. This reduces the coloring of the specular reflection while improving the gloss uniformity (particularly, the gloss clarity).

[Embodiment 2]

In Embodiment 1 described above, description is given of an example in which multiple dots are set at such adjacent positions that drops of the transparent ink formed in the same scan operation come into contact with one another, and the drops are thereby integrated on the recording medium. The unit of this integration is set to 40 µm or more and 320 µm or less. The nonuniformity (variation) of the thickness in the ink with high transmittance (transparent ink) is thereby increased with the inclination of the normal direction to the image surface kept small. This reduces the coloring of the specular reflection while improving the gloss uniformity (particularly, the gloss clarity).

In the embodiment, the ejection amount of each drop of the transparent ink is set to be greater than those of the other inks, and dots are set such that drops of the transparent ink do not come into contact with one another. Specifically, the recording head 251 is set to eject the transparent ink by an amount by which a dot with a diameter of 40 μm to 320 μm is formed on the recording medium. In a case where a general inkjet gloss sheet is used as the recording medium, the diameter of dots on the recording medium can be set to 40 μm to 320 μm by setting the ejection amount to about seven picoliters to several hundred picoliters. Note that, the color inks (CMYK) other than the transparent ink are ejected by an amount of about two to four picoliters so that that the diameter of dots on the recording medium can be set to about 20 μm to 30 μm as in Embodiment 1.

The control unit 951 of the embodiment performs printing by using the recording head 251 set as described above while performing different types of processing for the ink T (transparent) with relatively high transmittance which is arranged in an upper layer and the ink C (cyan) with relatively low transmittance. The characteristics of the processing for the transparent ink (T) in the embodiment is such that the cycle of the thickness variation in the transparent ink is set to 40 μm or more and 320 μm or less and the nonuniformity of the thickness is increased with the inclination of the normal direction to the image surface kept small as in Embodiment 1. This reduces the coloring of the specular reflection due to the bronzing and the thin-film interference phenomenon while improving the gloss uniformity, particularly, the gloss clarity.

Specifically, since the ejection amount of each drop of the transparent ink in the embodiment is great, the number of dots for the transparent ink ejection is set smaller than that for the other color inks. Furthermore, the dots are set such that multiple drops of the transparent ink formed in the same scan operation are dispersed not to come into contact with one another. Changes in the aforementioned processing until the drops are fixed are illustrated in part (b) of FIG. 15 (1507 to 1512).

First, in the case where the ejection amount of each drop is great, dots are set such that drops formed in the same scan operation do not come into contact with one another, and ink liquid is ejected from the recording head 251 (1507). Next, a single large ink drop is formed on the recording medium (1508). The drop is set such that the diameter of a dot formed in this case is 40 μm to 320 μm.

Formation of ink drops in the same scan operation is completed and the ink is solidified and fixed with elapse of time (1509). The nonuniformity of the thickness is increased after the solidification (fixation) because the ejection amount is great. The time required for the solidification (fixation) is several hundred milliseconds at most. Accordingly, in the subsequent scan operation, the integration of ink drops do not occur at positions where dots formed in the subsequent operation are adjacent to the dots formed in the previous scan operation (1510, 1511). The drops are formed in multiple scan operations not to come into contact with one another, and the cycle of the thickness variation is controlled to form a lens shape having a cycle of 40 μm to 320 μm (1512).

As a result, the nonuniformity (variation) of the thickness in the transparent ink is increased with the inclination of the normal direction to the image surface kept small. This reduces the coloring of the specular reflection while improving the gloss uniformity (particularly, the gloss clarity). Note that, as described above, it is known from the analysis by means of subjective evaluation (sensory evaluation) that the specular reflection appears white in a case where the difference between the thin portion and the thick portion in the nonuniformity of the thickness in the transparent ink is 180 nm (nanometers) or more. Accordingly, it is preferable to set the difference to 180 nm or more. However, depending on the composition of the ink drops and the like, the difference of 180 nm or more cannot be achieved in some cases. In such cases, it is desirable to increase the nonuniformity as much as possible.

Figure 26:
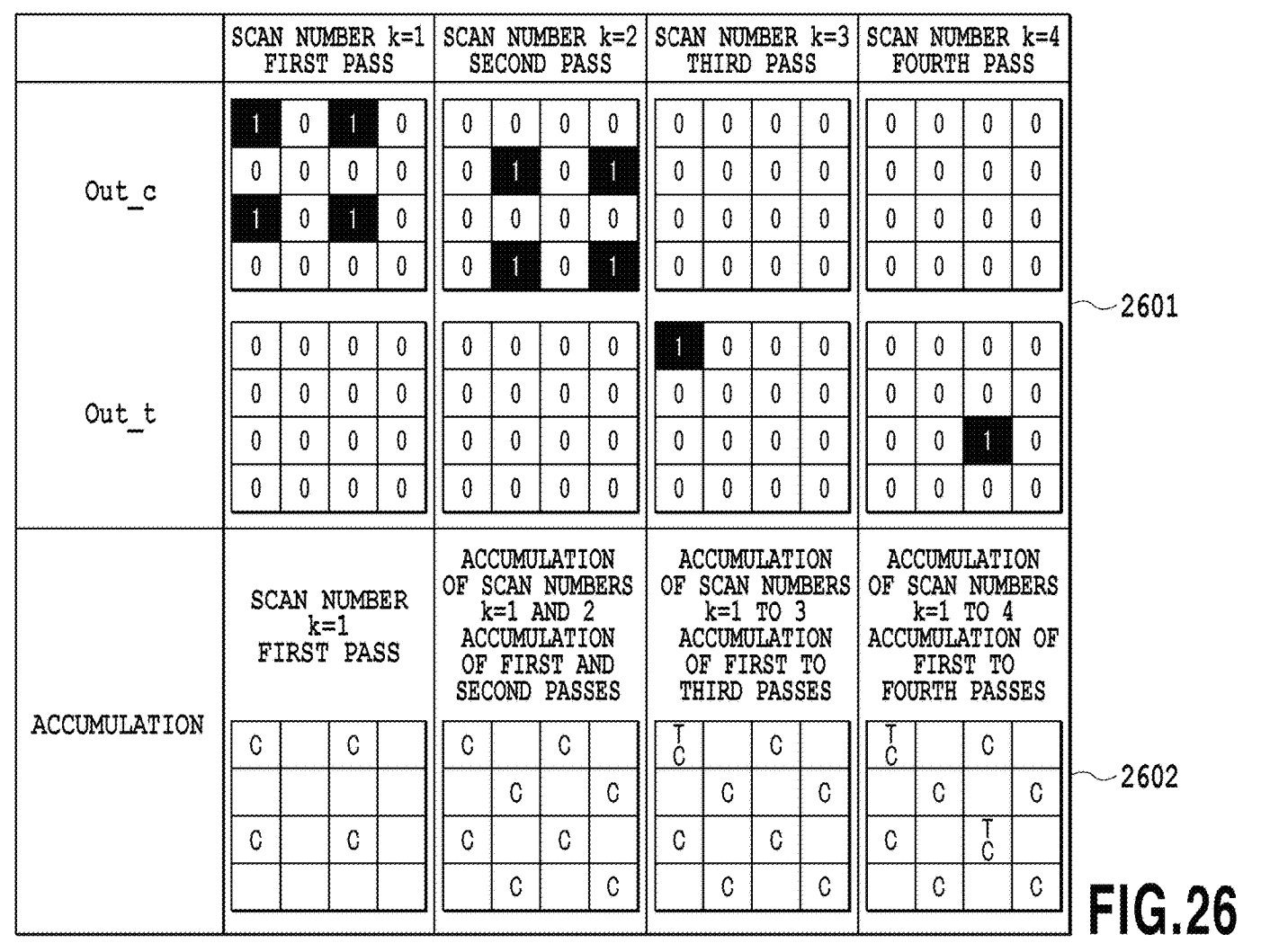

In the aforementioned processing, dots of the cyan ink and the transparent ink are obtained as illustrated in FIG. 26 in each scan operation and at the end. Each piece of dot data 2601 of FIG. 26 includes pieces of dot data of the cyan ink and the transparent ink obtained for the corresponding scan number. Each piece of cumulative dot data 2602 of FIG. 26 is accumulated dot data of dots of the cyan ink (C) and the transparent ink (T) which are formed in the corresponding scan number and the scan numbers therebefore. Moreover, cells in which letter T is written above letter C in the accumulated dot data 2602 indicate that the transparent ink overlaps the cyan ink and the transparent ink (T) is provided in the upper layer while the cyan ink (C) is provided in the lower layer. It can be understood from this accumulated dot data that, in regions where there is overlapping of the dot data of the cyan ink and the dot data of the transparent ink, the transparent ink is provided in the upper layer and the cyan ink is provided in the lower layer.

Moreover, in FIG. 26, the number of dots of the transparent ink is small, and intervals between the dots are 40 μm or more. Although the dots of the transparent ink are set as described above, since the dot size of the transparent ink on the recording medium is set to 40 μm or more and 320 μm or less, a large portion of the sheet surface can be covered with the dots.

Note that the dot data described above can be generated by means of the dithering processing in the control unit 951 in FIG. 9 of Embodiment 1 or the pass separation using the pass mask of the control unit 951 in FIG. 22 of the modified example of Embodiment 1.

As described above, in the embodiment, the ejection amount of each drop of the transparent ink is set to be greater than those of the other inks, and dots are set is such that drops of the transparent ink do not come into contact with one another.

Specifically, the recording head 251 is set to eject the transparent ink by an amount by which a dot with a diameter of 40 μm to 320 μm is formed on the recording medium.

The nonuniformity (variation) of the thickness in the ink with high transmittance (transparent ink) is thereby increased with the inclination of the normal direction to the image surface kept small. This reduces the coloring of the specular reflection while improving the gloss uniformity (particularly, the gloss clarity).

[Embodiment 3]

In the aforementioned Embodiments 1 and 2, the cycle of the thickness variation is set to 40 μm or more and 320 μm or less by bringing drops of the transparent ink formed in the same scan operation into contact with one another to integrate the drops or by ejecting a large amount of ink. The nonuniformity (variation) of the thickness in the ink with high transmittance (transparent ink) is thereby increased with the inclination of the normal direction to the image surface kept small. This reduces the coloring of the specular reflection while improving the gloss uniformity (particularly, the gloss clarity).

In the embodiment, there are first formed layers of the transparent ink whose minimum cycle of the thickness variation is shorter than 40 µm. In this case, the layers are formed to include cycle components of 40 µm to 320 µm as macro thickness variation in the transparent ink. Thereafter, multiple dots are set at such adjacent positions that drops of the transparent ink formed in the same scan operation come into contact with one another, and the drops are thereby integrated on the recording medium. The cycle components of the previously-formed transparent ink drops which are shorter than 40 µm are removed by this integration.

In the embodiment, as in Embodiment 1, the CMYKT inks are ejected by an amount of about two to four picoliters by which a dot with a diameter of about 20 µm to 30 µm is formed on the recording medium.

To achieve the operations described above, the control unit 951 of the embodiment performs different types of processing for the ink T (transparent) with relatively high transmittance which is arranged in the upper layer and the ink C (cyan) with relatively low transmittance.

The transparent ink is applied in the layer above the cyan ink also in the embodiment. The layers of the transparent ink are first formed such that the minimum cycle of the thickness variation is shorter than 40 µm. At this time, the layers are formed to include the cycle components of 40 µm to 320 µm as the macro thickness variation. Thereafter, the multiple dots are set at such adjacent positions that the drops of the transparent ink formed in the same scan operation come into contact with one another, and the drops are thereby integrated on the recording medium. The cycle components of the previously-formed transparent ink drops which are shorter than 40 µm are removed by this integration.

As in Embodiments 1 and 2, the cycle of the thickness variation in the transparent ink is thereby set to 40 µm or more and 320 µm or less, and the nonuniformity of the thickness is increased with the inclination of the normal direction to the image surface kept small. This reduces the coloring of the specular reflection due to the bronzing and the thin-film interference phenomenon while improving the gloss uniformity, particularly, the gloss clarity.

Figure 15:
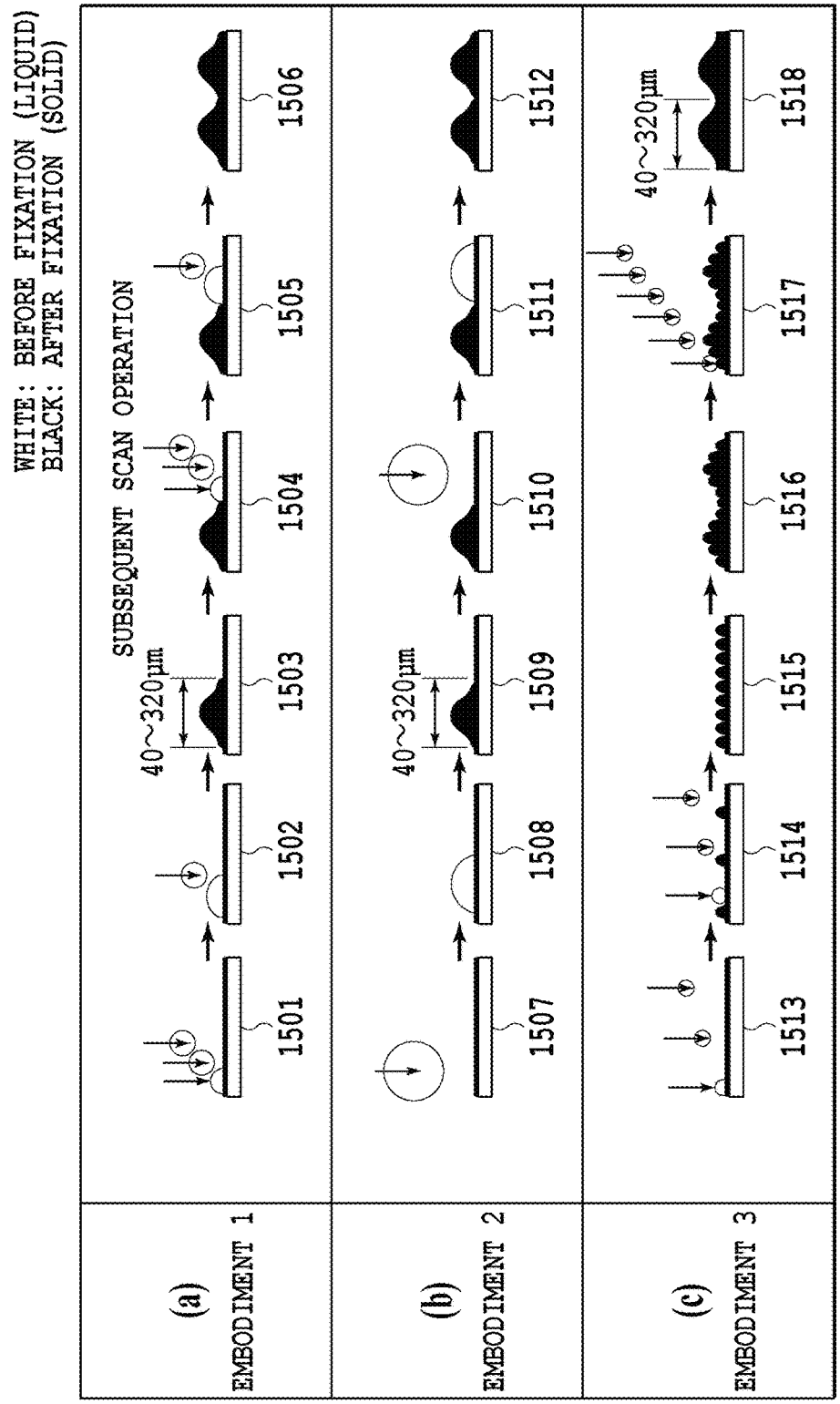
FIG. 15 is a diagram illustrating changes occurring in a case where a cycle of thickness variation in the transparent ink is controlled to form a lens shape having a cycle of 40 µm to 320 µm.

Changes in the aforementioned processing until the drops are fixed are illustrated in part (c) of FIG. 15 (1513 to 1518).

First, dots are set such that drops formed in the same scan operation do not come into contact with one another, and ink liquid is ejected from the recording head 251 (1513, 1514). In this case, since the diameter of the dots on the recording medium is 20 µm to 30 µm, the minimum cycle of the thickness variation in the transparent ink is shorter than 40 µm (1515).

Next, such dots are stacked one on top of another to form the layers including cycle components of 40 µm to 320 µm as the macro thickness variation in the transparent ink (1516).

Thereafter, multiple dots are set at such adjacent positions that drops of the transparent ink formed in the same scan operation come into contact with one another, and the drops are thereby integrated on the recording medium (1517). The cycle components of the previously-formed transparent ink drops which are shorter than 40 µm are removed by this integration. The cycle of the thickness variation is controlled to form a lens shape with a cycle of 40 µm to 320 µm (1518).

As a result, the nonuniformity (variation) of the thickness in the transparent ink is increased with the inclination of the normal direction to the image surface kept small. This reduces the coloring of the specular reflection while improving the gloss uniformity (particularly, the gloss clarity). Note that, as described above, it is known from the analysis by means of subjective evaluation (sensory evaluation) that the specular reflection appears white in a case where the difference between the thin portion and the thick portion in the nonuniformity of the thickness in the transparent ink is 180 nm (nanometers) or more. Accordingly, it is preferable to set the difference to 180 nm or more. However, depending on the composition of the ink drops and the like, the difference of 180 nm or more cannot be achieved in some cases. In such cases, it is desirable to increase the nonuniformity as much as possible.

Figure 27:
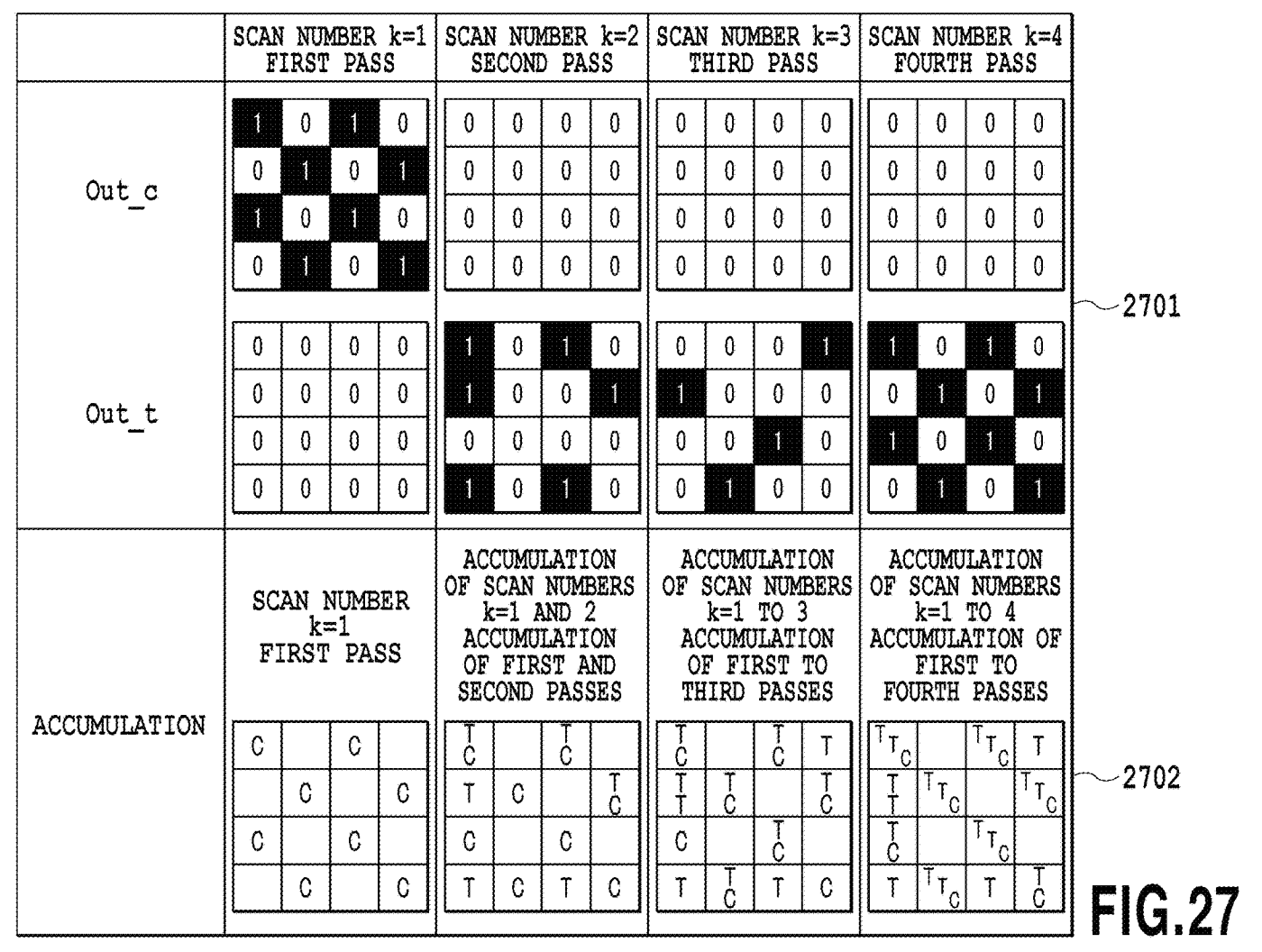

In the aforementioned processing, dots of the cyan ink and the transparent ink are obtained as illustrated in FIG. 27 in each scan operation and at the end. Each piece of dot data 2701 of FIG. 27 includes pieces of dot data of the cyan ink and the transparent ink obtained for the corresponding scan number. Each piece of accumulated dot data 2702 of FIG. 27 is accumulated dot data of dots of the cyan ink (C) and the transparent ink (T) which are formed in the corresponding scan number and the scan numbers therebefore. Moreover, cells in which letter T is written above letter C in the accumulated dot data 2702 indicate that the transparent ink overlaps the cyan ink and the transparent ink (T) is provided in the upper layer while the cyan ink (C) is provided in the lower layer. Specifically, cells in which the letters are written in the order of T and C from above mean that T is provided in the upper layer while C is provided in the lower layer. Moreover, cells in which the letters are written in the order of T, T, and C from above mean that three layers are formed and T is provided in the upper and intermediate layers while C is provided in the lower layer.

It can be understood from this accumulated dot data that, in regions where there is overlapping of the dot data of the cyan ink and the dot data of the transparent ink, the transparent ink is provided in the upper layer and the cyan ink is provided in the lower layer.

In FIG. 27, the cyan ink (C) is applied in the scan number k=1 (first pass). Meanwhile, the transparent ink is applied in the scan numbers k=2 (second pass) and k=3 (third pass). In the second and third passes, the dots in the dot data which are formed in the same scan operation by using the transparent ink (T) are not set at adjacent positions including horizontally, vertically, and diagonally adjacent positions, in most of the portions. In other words, in most of the portions, drops formed in the same scanning operation do not come into contact with each other, and the integration of ink drops on the recording medium thus does not occur. The layers whose minimum cycle of the thickness variation is shorter than 40 µm are thereby formed.

Furthermore, there are dots of the transparent ink which are formed in the scan operations of the second and third passes and which are stacked one on top of another. In other words, the nonuniformity of the thickness in the transparent ink is increased. In this case, the layers are formed to include the cycle components of 40 µm to 320 µm as the macro thickness variation.

In the scan operations of the second and third passes, a layer including the cycle components of 40 µm to 320 µm as the macro thickness variation is thus formed by the layers whose minimum cycle of the thickness variation is shorter than 40 µm.

Lastly, in the scan operation of the fourth pass, transparent ink drops are formed in pixels at adjacent positions including diagonally adjacent positions. The transparent ink drops formed in the same scan operation thereby come into contact with one another, and this removes the cycle components of the previously-formed transparent ink drops which are shorter than 40 μm. As a result, a lens-shaped layer whose cycle of the thickness variation is 40 μm to 320 μm is eventually formed.

Note that the dot data described above can be generated by means of the dithering processing in the control unit 951 in FIG. 9 of Embodiment 1 or the pass separation using the pass mask of the control unit 951 in FIG. 22 of the modified example of Embodiment 1. Furthermore, the dot data can be generated by combination of the dithering processing and the pass separation using the pass mask. For example, it is possible to generate the dot data for the second and third passes by means of the pass separation using the pass mask and generate the dot data for the fourth pass by means of the dithering processing.

As described above, in the embodiment, the layers whose cycle of the thickness variation is shorter than 40 μm are formed first. In this case, the layers are formed to include the cycle components of 40 μm to 320 μm as the macro thickness variation. Thereafter, the dots are set at such adjacent positions that the drops of the transparent ink formed in the same scan operation come into contact with one another, and the drops are thereby integrated on the recording medium. The cycle components of the previously-formed transparent ink drops which are shorter than 40 μm are removed by this integration.

The nonuniformity (variation) of the thickness in the ink with high transmittance (transparent ink) is thereby increased with the inclination of the normal direction to the image surface kept small. This reduces the coloring of the specular reflection while improving the gloss uniformity (particularly, the gloss clarity).

Moreover, in Embodiment 3 described above, the nonuniformity of the thickness in the transparent ink is controlled by controlling the dot data used in each scan operation. For example, the nonuniformity of the thickness is increased in the second and third passes and the small cycle components of the previously-formed drops which are shorter than 40 μm are removed in the fourth pass. However, similar effects can be obtained by using two or more types of transparent inks which differ in ink composition. For example, in the second and third passes (preceding passes), transparent ink layers whose cycle of the thickness variation is shorter than 40 μm and which include the cycle components of 40 μm to 320 μm are formed by using a first transparent ink apt to form a relatively uneven surface. Thereafter, in the fourth pass (successive pass), a transparent ink layer is formed by using a second transparent ink apt to form a relatively even surface which is different from the first transparent ink apt to form a relatively uneven surface, and the cycle components shorter than 40 μm are thereby removed. By using different types of inks as described above, the nonuniformity (variation) of the thickness in the ink with high transmittance (transparent ink) can be increased with the inclination of the normal direction to the image surface kept small. As a result, the coloring of the specular reflection can be reduced with the gloss uniformity (particularly, the gloss clarity) improved.

<Modified Example>

In the embodiments described above, description is given of the image formation apparatus using a serial inkjet recording method in which the recording head having the multiple nozzles arranged in a predetermined direction is made to perform multiple scanning operations on the recording medium in the direction intersecting the arrangement direction of the nozzles. However, the processing in the embodiments described above can be also applied to an inkjet recording method using multiple full-line heads for each color. In this case, the order of ink application is set such that the transparent ink is applied last. Moreover, the dot data for each scan operation is replaced by dot data to be formed by each head.

Moreover, the present invention can be applied to a recording apparatus which performs recording in accordance with a method other than the inkjet method (for example, a thermal transfer method or an electrophotographic method). In this case, the nozzles ejecting the ink drops correspond to recording elements and laser light emitting elements for recording the dots.

The present invention can reduce the coloring of the specular reflection while improving the gloss uniformity (particularly, the gloss clarity).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc(BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-225199, filed Nov. 5, 2014, and No. 2015-203158, filed Oct. 14, 2015, which are hereby incorporated by reference wherein in their entirety.

What is claimed is:

1. An image formation apparatus configured to form an image by using at least a first printing material and a second printing material which vary in transmittance, comprising:

a recording unit configured to perform recording on at least part of a surface of a recording medium by applying the first printing material which has the higher transmittance than the second printing material; and a control unit configured to control the recording unit such that thickness of the first printing material to be recorded on the recording medium is varied to be a cyclic pattern comprised of a plurality of dots and that a cycle of the pattern is set to 40 μm or more and 320 μm or less.

2. The image formation apparatus according to claim 1, wherein the control unit is configured to control the recording unit such that an amplitude of the pattern is set to 180 nm or more in a region where an average thickness of the first printing material is 2 μm or less.

3. The image formation apparatus according to claim 1, wherein the recording unit is configured to perform a scan operation of recording in a predetermined region by applying the second printing material, and then performs a plurality of scan operations of recording in the predetermined region by applying the first printing material.

4. The image formation apparatus according to claim 1, wherein the control unit is configured to obtain data indicating a region in which a dot of the first printing material is to be formed, and to control the recording unit based on the obtained data.

5. The image formation apparatus according to claim 4, wherein the control unit is configured to obtain data which is generated based on dithering processing and which is for setting the cycle of the pattern to 40 μm or more and 320 μm or less.

6. The image formation apparatus according to claim 4, wherein the control unit is configured to obtain data which is generated based on mask separation processing and which is for setting the cycle of the pattern to 40 μm or more and 320 μm or less.

7. The image formation apparatus according to claim 1, wherein the control unit is configured to control the cycle of the pattern by bringing a plurality of drops of the first color material formed in the same recording scan operation into contact with one another on the recording medium.

8. The image formation apparatus according to claim 1, wherein the control unit is configured to control the cycle of the pattern by controlling a size of a single drop of the first printing material on the recording medium.

9. The image formation apparatus according to claim 1, wherein the control unit is configured to set the cycle of the pattern to 40 μm or more and 320 μm or less by: applying the first printing material such that a pattern includes a cycle shorter than 40 μm; and then applying the first printing material such that a plurality of drops of the first printing material come into contact with one another on the recording medium.

10. The image formation apparatus according to claim 9, wherein the control unit is configured to set the cycle of the pattern to 40 μm or more and 320 μm or less in one region by: controlling the record of the first print material such that a pattern includes a cycle shorter than 40 μm in a first scan operation; and controlling a second scan operation posterior to the first scan operation such that a plurality of drops of the first printing material come into contact with one another on the recording medium.

11. A printed material formed on a recording medium by recording at least a first printing material and a second printing material which vary in transmittance, wherein
the first printing material which has the higher transmittance than the second printing material is applied on the second printing material,
thickness of the first printing material recorded on the recording medium is varied to be a cyclic pattern comprised of a plurality of dots, and
a cycle of the pattern is set to have 40 μm or more and 320 μm or less.

12. An image formation method of forming an image by using at least a first printing material and a second printing material which vary in transmittance, comprising:
a control step of performing control such that thickness of the first printing material to be recorded on a recording medium is varied to be a cyclic pattern comprised of a plurality of dots and that a cycle of the pattern is set to 40 μm or more and 320 μm or less; and
a recording step of performing recording on at least part of a surface of the recording medium by applying the first printing material which has the higher transmittance than the second printing material, based on the control of the control step.

13. A non-transitory computer readable storage medium storing a program which causes a computer to perform an image formation method of forming an image by using at least a first printing material and a second printing material which vary in transmittance, wherein the image formation method includes:
a control step of performing control such that thickness of the first printing material to be recorded on a recording medium is varied to be a cyclic pattern comprised of a plurality of dots and that a cycle of the pattern is set to 40 μm or more and 320 μm or less; and
a recording step of performing recording on at least part of a surface of the recording medium by applying the first printing material which has the higher transmittance than the second printing material, based on the control of the control step.

14. An image formation apparatus configured to form an image by using at least a first printing material and a second printing material which vary in transmittance, comprising:
a recording unit configured to perform recording on at least part of a surface of a recording medium by applying the first printing material which has the higher transmittance than the second printing material; and
a control unit configured to control the recording unit such that thickness of the first printing material to be recorded on the recording medium is varied to be a cyclic pattern comprised of a plurality of dots and that a cycle of the pattern is set to a first value or more and a second value or less, wherein
the first value is a value for making a normal direction of an image surface identical or approximate to a normal direction of the recording medium, and the second value is a value by which the thickness is varied such that a color of specular reflection cannot be visually perceived in a case where the image is observed.

15. The image formation apparatus according to claim 14, wherein the second value is a value according to frequency response of vision.

16. The image formation apparatus according to claim 14, wherein the first printing material is a first color material and the second printing material is a second color material, and
the control is configured to control the recording unit such that thickness variation in the applied first color material is set to have an amplitude that generates interference fringes and to have a desired cycle within a range of 40 μm or more and 320 μm or less.

17. An image formation method of forming an image by using at least a first printing material and a second printing material which vary in transmittance, comprising:
a control step of performing control such that thickness of the first printing material to be recorded on a recording medium is varied to be a cyclic pattern comprised of a plurality of dots and that a cycle of the pattern is set to a first value or more and a second value or less; and a recording step of performing recording on at least part of a surface of the recording medium by applying the first printing material which has the higher transmittance than the second printing material, based on the control of the control step, wherein
the first value is a value for making a normal direction of an image surface identical or approximate to a normal direction of the recording medium, and
the second value is a value by which the thickness is varied such that a color of specular reflection cannot be visually perceived in a case where the image is observed.

* * * * *